United States Patent
Aragaki et al.

(10) Patent No.: US 8,248,434 B2
(45) Date of Patent: Aug. 21, 2012

(54) IMAGE PROCESSING DEVICE, IMAGE DISPLAY APPARATUS, AND IMAGE PROCESSING METHOD

(75) Inventors: Takumi Aragaki, Matsumoto (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 12/407,334

(22) Filed: Mar. 19, 2009

(65) Prior Publication Data

US 2009/0244088 A1 Oct. 1, 2009

(30) Foreign Application Priority Data

Mar. 27, 2008 (JP) ................................. 2008-082853

(51) Int. Cl.
*G09G 5/00* (2006.01)
*G03B 21/14* (2006.01)
(52) U.S. Cl. ......................................... 345/613; 353/89
(58) Field of Classification Search .................. 345/613; 353/69

See application file for complete search history.

(56) References Cited

U.S. PATENT DOCUMENTS 6,603,885 B1 * 8/2003 Enomoto ....................... 382/263

FOREIGN PATENT DOCUMENTS

JP A 61-150487 7/1986
JP 08205181 A * 8/1996

* cited by examiner

*Primary Examiner* — Xiao M. Wu
*Assistant Examiner* — Yingchun He
(74) *Attorney, Agent, or Firm* — Oliff & Berridge, PLC

(57) ABSTRACT

An image processing device adapted to correct a pixel value corresponding to a sub-pixel constituting a pixel includes a displacement amount storage section adapted to store a displacement amount of a display position of a display sub-pixel corresponding to the sub-pixel constituting a display pixel in a reference position in a display image plane, and a pixel value correction section adapted to correct the pixel value of the sub-pixel corresponding to the display sub-pixel at an end of the display image plane in accordance with the displacement amount stored in the displacement amount storage section.

8 Claims, 17 Drawing Sheets

| P1 | $(\Delta R11x, \Delta R11y),(\Delta B11x, \Delta B11y)$ |
| --- | --- |
| P2 | $(\Delta Rm1x, \Delta Rm1y),(\Delta Bm1x, \Delta Bm1y)$ |
| P3 | $(\Delta R1nx, \Delta R1ny),(\Delta B1nx, \Delta B1ny)$ |
| P4 | $(\Delta Rmnx, \Delta Rmny),(\Delta Bmnx, \Delta Bmny)$ |

IMAGE PROCESSING DEVICE, IMAGE DISPLAY APPARATUS, AND IMAGE PROCESSING METHOD

BACKGROUND

1. Technical Field

The present invention relates to an image processing device, an image display apparatus, and an image processing method.

2. Related Art

In recent years, high performance image display apparatuses such as large screen televisions or projectors have been spread widely, and in such image display apparatuses, improvement in image quality of the display images becomes further more important. In particular, regarding the projectors appreciated as image display apparatuses having a high flexibility in implementation, and the capability of easily adjusting the size of the display image with a zoom function, demands on the further improvement in the image quality have been increasing in accordance with the improvement in the image quality of the contents themselves.

Regarding such projectors, JP-A-61-150487 discloses a projector using a transmissive matrix liquid crystal display device as a light valve. This projector is provided with a plurality of dichroic mirrors, separates the light from a light source into three beams of primary colors of R, G, and B with the plurality of dichroic mirrors, transmits the beams through respective liquid crystal display devices, and then projects the beams on a screen via a projection lens. In this case, the transmitted beams from the liquid crystal display devices are combined by an optical section such as a mirror so that two-dimensional display pixel arrangements match with each other.

In this kind of projector, it is possible to achieve improvement in the image quality of the display image by increasing the number of pixels of the matrix liquid crystal display device, for example, and executing light modulation based on the image signal corresponding to the contents to execute image display.

However, due to chromatic aberration of an optical system of the projector or adjustment accuracy of the positioning section for component members of the optical system, there are caused variations in display of the display sub-pixels corresponding to the sub-pixels composing each of the pixels. Therefore, there arises a problem that in the edge section of the display image on the screen, for example, degradation in the sense of resolution or generation of a false color are caused to incur degradation in the image quality of the display image. Although such an amount of the displacement of the display position of the display sub-pixel corresponding to the sub-pixel is negligible in the case in which the number of display pixels is small, the displacement of the display position becomes noticeable as the number of display pixels increases, there is a tendency that the degradation of the image quality due to the displacement of the display position of the display sub-pixel on the screen is apt to be incurred.

SUMMARY

In view of the technical problem described above, the invention has an advantage of providing an image processing device, an image display apparatus, and an image processing method each capable of suppressing the degradation of the image quality of the display image due to the displacement of the display position of the display sub-pixel corresponding to the sub-pixel constituting each pixel.

An aspect of the invention relates to an image processing device adapted to correct a pixel value corresponding to a sub-pixel constituting a pixel including a displacement amount storage section adapted to store a displacement amount of a display position of a display sub-pixel corresponding to a sub-pixel constituting a display pixel in a reference position in a display image plane, and a pixel value correction section adapted to select a reference display sub-pixel corresponding to a sub-pixel constituting the display pixel at a target display position in the display image plane, and corrects the pixel values of the sub-pixels corresponding to the remaining display sub-pixels constituting the display pixel based on the reference display sub-pixel in accordance with the displacement amount stored in the displacement amount storage section.

According to this aspect of the invention, since it is arranged that the displacement amount of the display position of the display sub-pixel, which constitutes the display pixel at the reference position in the display image plane and corresponds to the sub-pixel, is previously stored, the reference display sub-pixel constituting the display pixel at the target display position in the display image plane is selected, and the pixel values of the sub-pixels corresponding to the remaining display sub-pixels are corrected based on the reference display sub-pixel, it becomes possible to suppress degradation in the feeling of resolution and generation of false colors at the target display position in the display image plane to suppress the degradation in the image quality of the display image plane even in the case in which the display position of the display sub-pixel constituting the display pixel at the target display position is displaced.

Further, another aspect of the invention relates to an image processing device adapted to correct a pixel value corresponding to a sub-pixel constituting a pixel including a displacement amount storage section adapted to store a displacement amount of a display position of a display sub-pixel constituting a display pixel in a reference position in a display image plane, and corresponding to the sub-pixel, and a pixel value correction section adapted to correct the pixel value of the sub-pixel corresponding to the display sub-pixel at an end of the display image plane in accordance with the displacement amount stored in the displacement amount storage section.

According to this aspect of the invention, since it is arranged that the displacement amount of the display position of the display sub-pixel, which constitutes the display pixel at the reference position in the display image plane and corresponds to the sub-pixel, is previously stored, and the pixel value of the display sub-pixel constituting the display pixel at the end of the display image plane is corrected, it becomes possible to suppress the degradation in the feeling of resolution and the generation of the false colors at the end even in the case in which the display position of the display sub-pixel constituting the display pixel at the end of the display image plane, where the false color occurs the most frequently, is displaced.

Further, in the image processing device according to another aspect of the invention, it is possible that the displacement amount storage section stores the displacement amounts of the display positions of the display sub-pixels at a plurality of reference positions in the display image plane, and the pixel value correction section calculates the displacement amount of the display position of the display sub-pixel at the end by interpolating the displacement amounts of the display positions of the display sub-pixels in a plurality of reference positions stored in the displacement amount storage section, and then corrects the pixel value of the sub-pixel corresponding to the display sub-pixel at the end in accordance with the displacement amount.

According to this aspect of the invention, it becomes possible to reduce the storage capacity of the displacement amount storage section, and therefore, it becomes possible to achieve cost reduction of the image processing device in addition to the advantage described above.

Further, in the image processing device according to another aspect of the invention, it is possible that the pixel value correction section includes a reference display sub-pixel selection section adapted to select, as a reference display sub-pixel, the display sub-pixel nearest to a center of the display image plane in a given direction among a plurality of display sub-pixels constituting the display pixels at the end, a display sub-pixel displacement amount calculation section adapted to calculate the displacement amounts of the remaining display sub-pixels except the reference display sub-pixel among the plurality of display sub-pixel, based on the displacement amount stored in the displacement amount storage section, and taking the display position of the reference display sub-pixel selected by the reference display sub-pixel selection section as the reference, and a pixel value correction operation section adapted to correct the pixel values of the sub-pixels corresponding to the remaining display sub-pixels except the reference display sub-pixel among the plurality of display sub-pixels, based on the displacement amount calculated by the display sub-pixel displacement amount calculation section.

According to this aspect of the invention, since it becomes possible to avoid correcting the pixel values of the sub-pixels corresponding to all of the display sub-pixels constituting the display pixel at the end section of the display image plane and to limit the sub-pixels to be the object of the pixel value correction, even in the case in which the display positions of the display sub-pixels constituting the display pixel at the end section of the display image plane are displaced, it becomes possible to suppress degradation in the feeling of resolution and generation of the false color in the end section with a little processing load.

Further, in the image processing device according to another aspect of the invention, it is possible that each of the pixels is constituted by at least an R component sub-pixel, a G component sub-pixel, and a B component sub-pixel, and the displacement amount storage section stores, based on the display position of the display sub-pixel corresponding to the G component sub-pixel constituting a display pixel at the reference position, the displacement amount of the display position of the display sub-pixel corresponding to the R component sub-pixel constituting the display pixel, and the displacement amount of the display position of the display sub-pixel corresponding to the B component sub-pixel constituting the display pixel.

According to this aspect of the invention, it becomes possible to reduce the storage capacity of the displacement amount storage section, and therefore, it becomes possible to achieve cost reduction of the image processing device in addition to the advantage described above.

Further, in the image processing device according to another aspect of the invention, it is possible that the pixel value correction section corrects the pixel values of the sub-pixels corresponding to the display sub-pixels at at least one of a left end, a right end, an upper end, and a lower end of the display image plane.

According to this aspect of the invention, it becomes possible to suppress the degradation in the feeling of resolution and the generation of the false colors at the end even in the case in which the display position of the display sub-pixel constituting the display pixel at the end of the display image plane, where the false color occurs most frequently, is displaced.

Further, in the image processing device according to another aspect of the invention, it is possible that the pixel value correction section corrects a luminance value of the sub-pixel corresponding to the display sub-pixel at the end.

According to this aspect of the invention, it becomes possible to suppress the degradation in the feeling of resolution and the generation of the false colors at the end with a simple process even in the case in which the display position of the display sub-pixel constituting the display pixel at the end of the display image plane is displaced.

Further, another aspect of the invention relates to an image display apparatus including either one of the image processing devices described above, and an image display section adapted to display an image based on the pixel value of the sub-pixel corrected by the image processing device.

According to this aspect of the invention, it becomes possible to provide the image display apparatus capable of suppressing the degradation in the image quality of the display image due to the displacement of the display positions of the display sub-pixels corresponding to the sub-pixels constituting each of the pixels.

Further, another aspect of the invention relates to an image processing method adapted to correct a pixel value corresponding to a sub-pixel constituting a pixel including the steps of obtaining the pixel value of the sub-pixel corresponding to a display sub-pixel at an end of a display image plane, and correcting, in accordance with a displacement amount of a display position of the display sub-pixel constituting a display pixel at a reference position in the display image plane and corresponding to the sub-pixel, the pixel value of the sub-pixel corresponding to the display sub-pixel at the end of the display image plane.

According to this aspect of the invention, since it is arranged that the displacement amount of the display position of the display sub-pixel, which constitutes the display pixel at the reference position in the display image plane and corresponds to the sub-pixel, is previously stored, and the pixel value of the display sub-pixel constituting the display pixel at the end of the display image plane is corrected, it becomes possible to suppress the degradation in the feeling of resolution and the generation of the false colors at the end even in the case in which the display position of the display sub-pixel constituting the display pixel at the end of the display image plane, where the false color occurs most frequently, is displaced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the accompanying drawings. It should be noted that the embodiments described below do not unreasonably limit the content of the invention as set forth in the appended claims. Further, not all of the constituents of the configurations described below are essential elements of the invention.

Although explanations will hereinafter be presented exemplifying a projector as the image display apparatus according to the invention, the image display apparatus according to the invention is not limited to the projector. In other words, the degradation of the image quality due to the displacement of the display position of the display sub-pixel corresponding to the sub-pixel constituting each pixel is thought to be a phenomenon, which can occur in various types of image display apparatuses besides the projector, and therefore, the image display apparatus according to the invention is not limited to the projector.

Figure 1:
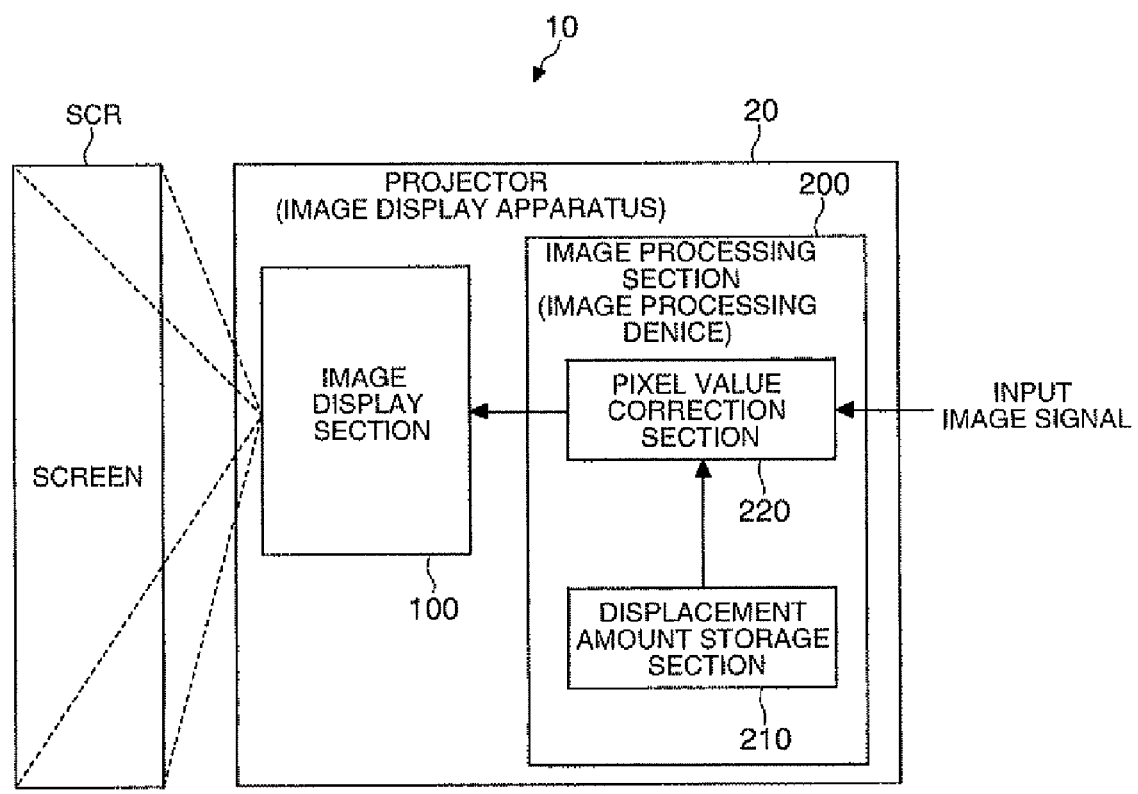
FIG. 1 is a block diagram of a configuration example of an image display system to which an image display apparatus according to an embodiment of the invention is applied.

FIG. 1 is a block diagram of a configuration example of an image display system to which the image display apparatus according to the embodiment of the invention is applied.

The image display system 10 in the present embodiment includes a projector 20 as the image display apparatus and a screen SCR. The projector 20 is provided with an input image signal input thereto, having a pixel value of each of a plurality of sub-pixels constituting each pixel. The projector 20 modulates light from a light source not shown based on the input image signal to project the light, thus modulated, on the screen SCR.

The projector 20 includes an image display section 100 and an image processing section (an image processing device, in a broad sense) 200. The image processing section 200 is provided with the input image signal input thereto, corrects the input image signal so as to suppress generation of a false color due to the displacement of the display position on the screen SCR of the display sub-pixel corresponding to the sub-pixel, and then supplies the image signal thus corrected to the image display section 100. Here, the false color denotes the color (not existing in the image desired to be displayed) of the image not originally intended.

The image display section 100 modulates light from a light source not shown based on the image signal corrected by the image processing section 200 to project the light, thus modulated, on the screen SCR. The pixel (the display pixel) of the projection image (the display image) projected on the screen SCR has a luminescent spot as an image on the screen SCR of the pixel of the light modulation section (light modulation element) which the projector 20 has, and the pixel of the projection image corresponds to the pixel of the light modulation section.

Hereinafter, the pixel displayed on the screen SCR and corresponding to the pixel of the light modulation section is referred to as a display pixel. Further, the pixel displayed on the screen SCR and corresponding to the sub-pixels constituting the pixel of the light modulation section is referred to as a display sub-pixel. In this case, the display pixel is constituted with the display sub-pixels.

The image processing section 200 for correcting the input image signal so as to suppress the generation of the false color due to the displacement of the display position on the screen SCR of the display sub-pixel includes a displacement amount storage section 210 and a pixel value correction section 220.

The displacement amount storage section 210 stores the amount of the displacement of the display position of the display sub-pixel corresponding to the sub-pixel constituting the display pixel in a reference position in a display image plane. For example, the amount of the displacement is stored by a given pixel measurement section in the displacement amount storage section 210 as a value corresponding to a measurement result of the pixel at a reference position in the display image plane of the screen SCR.

The pixel value correction section 220 corrects the pixel value of the sub-pixel corresponding to the display sub-pixel at the target display position in the display image plane (a projection image plane) projected on the screen SCR by the projector 20 (the image display section 100) based on the amount of the displacement stored in the displacement amount storage section 210. More specifically, the pixel value correction section 220 selects a reference display sub-pixel corresponding to the sub-pixel constituting the display pixel at the target display position in the display image plane, and corrects the pixel values of the sub-pixels corresponding to the remaining display sub-pixels constituting the display pixel based on the reference display sub-pixel in accordance with the amount of the displacement stored in the displacement amount storage section 210. It should be noted that it is preferable for the pixel value correction section 220 to correct an amount of luminance as the pixel value of the sub-pixel.

The target display position denotes a position where the generation of the false color needs to be suppressed even if there exists the displacement of the display position of the display sub-pixel on the screen SCR corresponding to the sub-pixel. Such a target display position can be set to be, for example, an end (the farthest point, an edge section, or a boundary section) of an image plane (a display image plane) which the projector 20 projects on the screen SCR. In this case, the pixel value correction section 220 corrects the pixel value of the sub-pixel corresponding to the display sub-pixels at the end in the display image plane in accordance with the amount of the displacement stored in the displacement amount storage section 210. Since the end of the display image plane of the screen SCR is an edge section of the image plane, and is a part where the luminance drastically changes, the end is a part where the false color is apt to occur unless the correction process according to the present embodiment is executed.

Although the image display section 100 and the image processing section 200 of the projector 20 in the present embodiment will hereinafter be explained assuming that each pixel is constituted with the sub-pixel of an R component, the sub-pixel of a G component, and the sub-pixel of a B component, the present embodiment is not limited to a particular number of sub-pixels (the number of color components) constituting each pixel.

Figure 2:
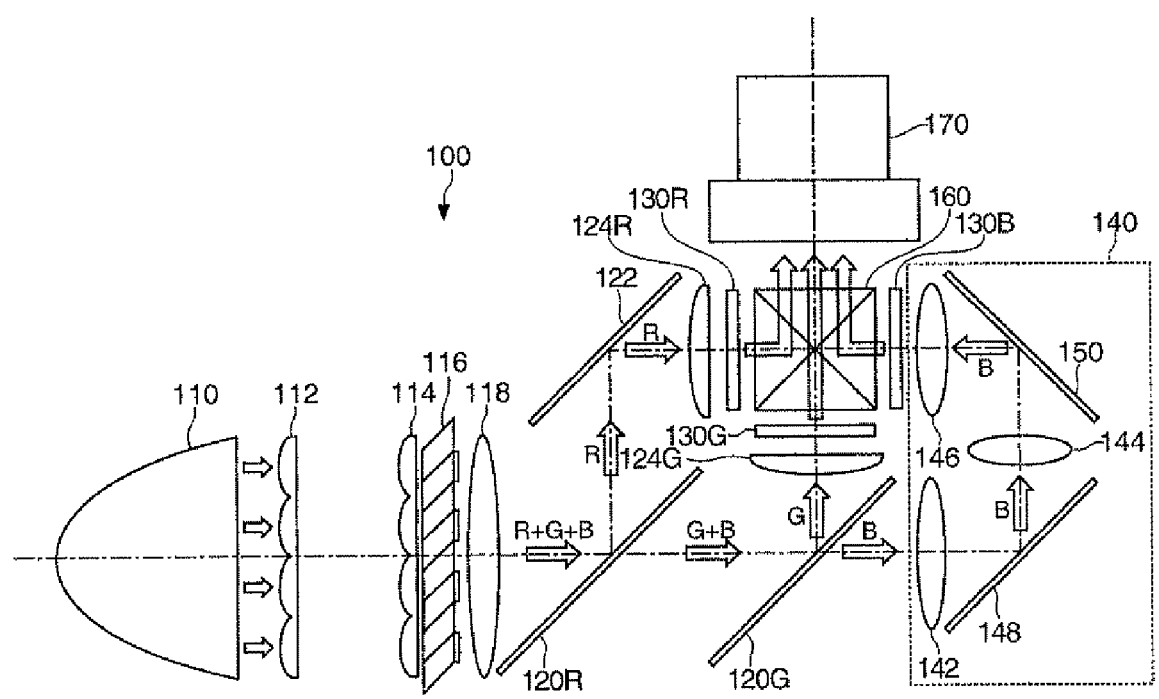
FIG. 2 is a diagram showing a configuration example of the image display section shown in FIG. 1.

FIG. 2 shows a configuration example of the image display section 100 shown in FIG. 1. In FIG. 2, although the explanation is presented assuming that the image display section 100 of the projector 20 in the present embodiment is formed of a so-called three panel liquid crystal projector, the image display section of the image display apparatus according to the invention is not limited to what is formed of a so-called three panel liquid crystal projector.

The image display section 100 includes a light source 110, integrator lenses 112, 114, a polarization conversion element 116, an overlapping lens 118, an R dichroic mirror 120R, a G dichroic mirror 120G, a reflecting mirror 122, an R field lens 124R, a G field lens 124G, an R liquid crystal panel 130R (a first light modulation section), a G liquid crystal panel 130G (a second light modulation section), a B liquid crystal panel 130B (a third light modulation section), a relay optical system 140, a cross dichroic prism 160, and a projection lens 170. Liquid crystal panels used as the R liquid crystal panel 130R, the G liquid crystal panel 130G, and the B liquid crystal panel 130B are each a transmissive liquid crystal display device. The relay optical system 140 includes relay lenses 142, 144, and 146, and reflecting mirrors 148 and 150.

The light source 110 is formed of, for example, a super high-pressure mercury lamp, and emits light including at least an R component light beam, a G component light beam, and a B component light beam. The integrator lens 112 has a plurality of small lenses for dividing the light from the light source 110 into a plurality of partial light beams. The integrator lens 114 has a plurality of small lenses corresponding respectively to the small lenses of the integrator lens 112. The overlapping lens 118 overlaps the partial light beams emitted from the plurality of small lenses of the integrator lens 112.

Further, the polarization conversion element 116 has a polarization splitting film and a λ/2 plate, and converts p-polarized light into s-polarized light by transmitting the p-polarized light while reflecting the s-polarized light. The s-polarized light from the polarization conversion element 116 is applied to the overlapping lens 118.

The light overlapped by the overlapping lens 118 enters the R dichroic mirror 120R. The R dichroic mirror 120R has a function of reflecting the R component light beam while transmitting the G component light beam and the B component light beam. The light transmitted through the R dichroic mirror 120R is applied to the G dichroic mirror 120G, and the light reflected by the R dichroic mirror 120R is reflected by the reflecting mirror 122 to be guided to the R field lens 124R.

The G dichroic mirror 120G has a function of reflecting the G component light beam while transmitting the B component light beam. The light transmitted through the G dichroic mirror 120G enters the relay optical system 140, while the light reflected by the G dichroic mirror 120G is guided to the G field lens 124G.

The relay optical system 140 corrects the difference in optical path length between the B component light beam transmitted through the G dichroic mirror 120G and the other light beams, namely the R component light beam and the G component light beam using the relay lenses 142, 144, and 146 in order for reducing the difference in the optical path length as much as possible. The light transmitted through the relay lens 142 is guided by the reflecting mirror 148 to the relay lens 144. The light transmitted through the relay lens 144 is guided by the reflecting mirror 150 to the relay lens 146. The light transmitted through the relay lens 146 is applied to the B liquid crystal panel 130B.

The light applied to the R field lens 124R is converted into collimated light, and input to the R liquid crystal panel 130R. The R liquid crystal panel 130R functions as the light modulation element (the light modulation section), and is arranged to vary the transmittance (penetration rate, or modulation rate) based on the R image signal. Therefore, the light (a first color component light beam) input to the R liquid crystal panel 130R is modulated based on the R image signal, and the light thus modulated is input to the cross dichroic prism 160.

The light applied to the G field lens 124G is converted into a collimated light beam, and input to the G liquid crystal panel 130G. The G liquid crystal panel 130G functions as the light modulation element (the light modulation section), and is arranged to vary the transmittance (penetration rate, or modulation rate) based on the G image signal. Therefore, the light (a second color component light beam) input to the G liquid crystal panel 130G is modulated based on the G image signal, and the light thus modulated is input to the cross dichroic prism 160.

The B liquid crystal panel 130B irradiated with the light converted by the relay lenses 142, 144, and 146 into the collimated light beam functions as the light modulation element (the light conversion section), and arranged to vary the transmittance (penetration rate, or modulation rate) based on the B image signal. Therefore, the light (a third color component light beam) input to the B liquid crystal panel 130B is modulated based on the B image signal, and the light thus modulated is input to the cross dichroic prism 160.

The R liquid crystal panel 130R, the G liquid crystal panel 130G, and the B liquid crystal panel 130B each have the same configuration. Each of the liquid crystal panels is what is obtained by encapsulating a liquid crystal material as an electro-optic material between a pair of transparent glass plates, and modulates the penetration rate of the light of each of the colors in accordance with the image signal of each of the sub-pixels using, for example, poly-silicon TFTs as switching elements.

In the present embodiment, the liquid crystal panel as the light modulation section is provided for each of the color components constituting each pixel, and the transmittance of each of the liquid crystal panels is controlled by the image signal corresponding to the sub-pixel. Specifically, the image signal for the sub-pixel of the R component is used for controlling the transmittance (penetration rate, or modulation rate) of the R liquid crystal panel 130R, the image signal for the sub-pixel of the C component is used for controlling the transmittance of the G liquid crystal panel 130G, and the image signal for the sub-pixel of the B component is used for controlling the transmittance of the B liquid crystal panel 130B. In the projector 20 of the present embodiment, the image signals for the respective color components are corrected, and the image signals thus corrected are supplied to the respective liquid crystal panels provided for the respective color components, thus the transmittance is controlled in the respective liquid crystal panels.

The cross dichroic prism 160 has a function of outputting the composite light beam, which is obtained by combining the incident light beams from the R liquid crystal panel 130R, the G liquid crystal panel 130G, and the B liquid crystal panel 130B, as an output light beam. The projection lens 170 is a lens for enlargedly imaging the output image on the screen SCR, and has a function of zooming or shrinking the image in accordance with the zoom magnification.

The image display section 100 in the present embodiment having the configuration described above can project the light, which is modulated based on the image signals thus corrected in accordance with the amounts of displacement of the display positions of the display sub-pixels corresponding to the sub-pixels as described above, on the screen SCR. Further, the projector 20 can include the image display section 100 for displaying the image based on the pixel values of the sub-pixels thus corrected by the image processing section 200.

Each of the sections of the image processing section 200 shown in FIG. 1 will hereinafter be explained.

Figures 3, 4:
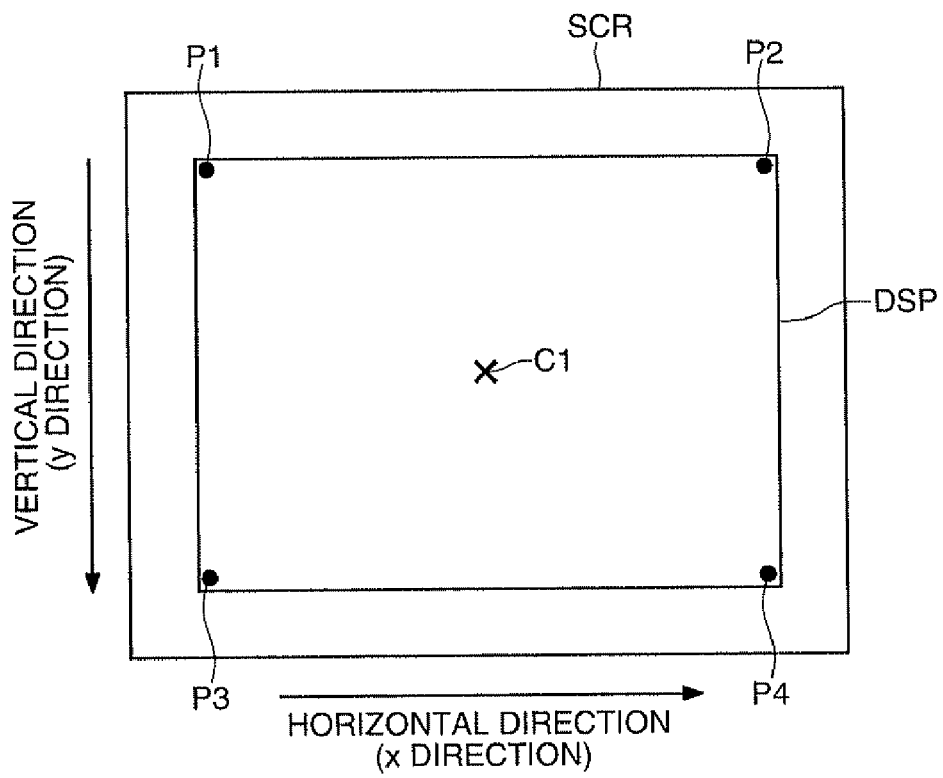
FIG. 3 is an explanatory diagram of an amount of displacement stored in a displacement amount storage section of the image processing section shown in FIG. 1.
FIG. 4 is an explanatory diagram of the displacement amount storage section shown in FIG. 1.

FIG. 3 shows an explanatory diagram of the amount of displacement to be stored in the displacement amount storage section 210 of the image processing section 200 shown in FIG. 1. FIG. 3 schematically shows a projection image plane (display image plane) DSP on the screen SCR projected by the projector 20. In FIG. 3, the same sections as those in FIG. 1 are denoted with the same reference numerals, and explanations therefor are omitted if appropriate.

FIG. 4 shows an explanatory diagram of the displacement amount storage section 210 shown in FIG. 1.

In the present embodiment, pixel positions P1 through P4 of the four corners of the display image plane DSP on the screen SCR are adopted as the reference positions in the display image plane. The pixel position P1 is one of the positions of a pixel group constituting the left end (the leftmost end) of the display image plane DSP, and at the same time, one of the positions of a pixel group constituting the upper end (the uppermost end) of the display image plane DSP. The pixel position P2 is one of the positions of the pixel group constituting the upper end of the display image plane DSP, and at the same time, one of the positions of a pixel group constituting the right end (the rightmost end) of the display image plane DSP. The pixel position P3 is one of the positions of the pixel group constituting the left end of the display image plane DSP, and at the same time, one of the positions of a pixel group constituting the lower end (the lowermost end) of the display image plane DSP. The pixel position P4 is one of the positions of the pixel group constituting the right end of the display image plane DSP, and at the same time, one of the positions of the pixel group constituting the lower end of the display image plane DSP.

Further, the displacement amount storage section 210 stores the amounts of the displacement of the display positions of the display sub-pixels constituting the display pixel in each of the pixel positions P1 through P4 at the respective four corners. In other words, the displacement amount storage section 210 stores the amount of the displacement of the display positions of the display sub-pixels in a plurality of ends (reference positions) in the display image plane DSP.

Further, in the present embodiment, the displacement amount storage section 210 stores the amount of the displacement of the display position of the display sub-pixel corresponding to the R component sub-pixel constituting the display pixel and the amount of the displacement of the display position of the display sub-pixel corresponding to the B component sub-pixel constituting the display pixel based on the display position of the display sub-pixel corresponding to the G component sub-pixel out of the R component sub-pixel, the G component sub-pixel, and the B component sub-pixel constituting one pixel for each of the pixel positions (reference positions) P1 through 24 at the four corners. Thus, the storage capacity of the displacement amount storage section 210 can be reduced, and it becomes possible to achieve cost reduction of the image processing section 200 and the projector 20 including the image processing section 200. Further, by taking the G component, which can easily be recognized by the human eyes, as the reference, the process using the amount of displacement can be made easy to deal with.

Here, assuming that the number of pixels arranged in the horizontal direction of the display image plane DSP shown in FIG. 3 is m (m is a counting number equal to or greater than 2), and the number of pixels thereof in the vertical direction is n (n is a counting number equal to or greater than 2), the pixel position P1 is represented as (1,1), the pixel position P2 is represented as (m,1), the pixel position P3 is represented as (1,n), and the pixel position P4 is represented as (m,n). Further, as shown in FIG. 4, the displacement amount storage section 210 stores the displacement amount $\Delta R11x$ in the horizontal direction (x direction) of the R component display sub-pixel and the displacement amount $\Delta R11y$ in the vertical direction (y direction) of the R component display sub-pixel based on the display position of the G component display sub-pixel constituting the display pixel of the pixel position P1, and the displacement amount $\Delta B11x$ in the horizontal direction of the B component display sub-pixel and the displacement amount $\Delta B11y$ in the vertical direction of the B component display sub-pixel based on the display position of the G component display sub-pixel constituting the display pixel of the pixel position P1, as the amount of the displacement corresponding to the pixel position P1.

In a similar manner, the displacement amount storage section 210 stores the displacement amount $\Delta Rm1x$ in the horizontal direction of the R component display sub-pixel and the displacement amount $\Delta Rm1y$ in the vertical direction of the R component display sub-pixel based on the display position of the G component display sub-pixel constituting the display pixel of the pixel position P2, and the displacement amount $\Delta Bm1x$ in the horizontal direction of the B component display sub-pixel and the displacement amount $\Delta Bm1y$ in the vertical direction of the B component display sub-pixel based on the display position of the G component display sub-pixel constituting the display pixel of the pixel position P2, as the amount of the displacement corresponding to the pixel position P2. Further, the displacement amount storage section 210 stores the displacement amount $\Delta R1nx$ in the horizontal direction of the R component display sub-pixel and the displacement amount $\Delta R1ny$ in the vertical direction of the R component display sub-pixel based on the display position of the G component display sub-pixel constituting the display pixel of the pixel position P3, and the displacement amount $\Delta B1nx$ in the horizontal direction of the B component display sub-pixel and the displacement amount $\Delta B1ny$ in the vertical direction of the B component display sub-pixel based on the display position of the G component display sub-pixel constituting the display pixel of the pixel position P3, as the amount of the displacement corresponding to the pixel position P3. Further, the displacement amount storage section 210 stores the displacement amount $\Delta Rmnx$ in the horizontal direction of the R component display sub-pixel and the displacement amount ΔRmny in the vertical direction of the R component display sub-pixel based on the display position of the G component display sub-pixel constituting the display pixel of the pixel position P4, and the displacement amount ΔBmnx in the horizontal direction of the B component display sub-pixel and the displacement amount ΔBmny in the vertical direction of the B component display sub-pixel based on the display position of the G component display sub-pixel constituting the display pixel of the pixel position P4, as the amount of the displacement corresponding to the pixel position P4.

Further, prior to the correction of the pixel value of the sub-pixel corresponding to the displacement amount, the pixel value correction section 220 interpolates the displacement amount stored in the displacement amount storage section 210, thereby obtaining the displacement amount of the display position of the display sub-pixel constituting the display pixel at the pixel position of the target display position of the display image plane DSP. Specifically, the pixel value correction section 220 interpolates the displacement amounts of the display positions of the display sub-pixels at the plurality of reference positions stored in the displacement amount storage section 210 to calculate the displacement amount of the display position of the display sub-pixels at the end of the display image plane DSP, and corrects the pixel value of the sub-pixel corresponding to the display sub-pixels at the end of the display image plane DSP in accordance with the displacement amount thus calculated.

Figure 5:
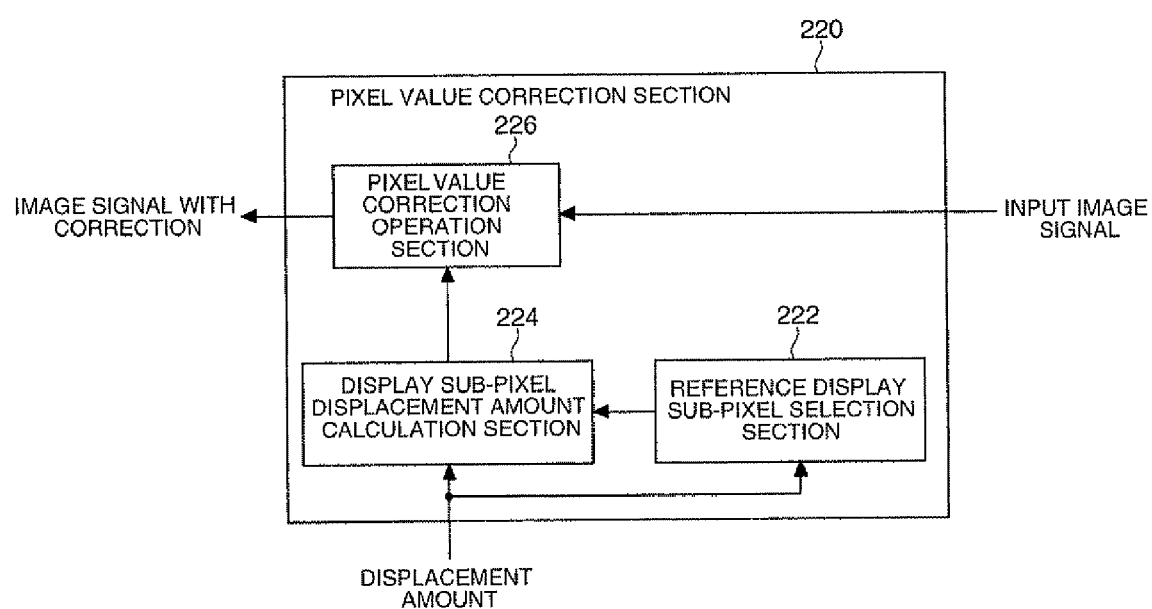
FIG. 5 is a block diagram of a configuration example of the pixel value correction section shown in FIG. 1.

FIG. 5 shows a block diagram of a configuration example of the pixel value correction section 220 shown in FIG. 1.

The pixel value correction section 220 includes a reference display sub-pixel selection section 222, a display sub-pixel displacement amount calculation section 224, and a pixel value correction operation section 226.

The reference display sub-pixel selection section 222 selects the display sub-pixel, which is the nearest to the center section C1 (see FIG. 3) of the display image plane DSP in the given direction out of the plurality of display sub-pixels constituting the display pixels at the end of the display image plane DSP of the screen SCR, as the reference display sub-pixel. Here, in the case of the left end or the right end of the display image plane DSP, the display sub-pixel, which is the nearest to the center section C1 of the display image plane DSP in the horizontal direction (the x direction) out of the plurality of display sub-pixels constituting the display pixels at the end, is selected as the reference display sub-pixel. In the case of the upper end or the lower end of the display image plane DSP, the display sub-pixel, which is the nearest to the center section C1 of the display image plane DSP in the vertical direction (the y direction) out of the plurality of display sub-pixels constituting the display pixels at the end, is selected as the reference display sub-pixel.

Based on the displacement amount stored in the displacement amount storage section 210, the display sub-pixel displacement amount calculation section 224 calculates the displacement amount of the remaining display sub-pixels except the reference display sub-pixel out of the plurality of display sub-pixels constituting the display pixels at the end of the display image plane DSP based on the display position of the reference display sub-pixel selected by the reference display sub-pixel selection section 222.

The pixel value correction operation section 226 corrects the pixel values of the sub-pixels corresponding to the remaining display sub-pixels except the reference display sub-pixel out of the plurality of display sub-pixels constituting the display pixels at the end of the display image plane DSP based on the displacement amount calculated by the display sub-pixel displacement amount calculation section 224. The pixel value correction operation section 226 outputs the image signal thus corrected to the image display section 100 in FIG. 1.

Thus, since it becomes possible to avoid correcting the pixel values of the sub-pixels corresponding to all of the display sub-pixels constituting the display pixels at the end of the display image plane DSP and to limit the sub-pixels to be the object of the pixel value correction, even in the case in which the display positions of the display sub-pixels constituting the display pixels at the end of the display image plane DSP are displaced, it becomes possible to suppress degradation in the feeling of resolution and generation of the false color in the end with a little processing load.

It should be noted that the pixel value correction section 220 does not need to correct the pixel values of the sub-pixels corresponding to the display sub-pixels constituting the display pixels at all of the ends, namely the left end, the right end, the upper end, and the lower end of the display image plane DSP. For example, the pixel value correction section 220 can correct the pixel values of the sub-pixels corresponding to the display sub-pixels at at least one of the ends, namely the left end, the right end, the upper end, and the lower end of the display image plane DSP.

In the projector 20 having the configuration described above, it becomes possible to prevent the degradation in the image quality of the projection image on the screen SCR by correcting the pixel values so as to suppress generation of the false color at the ends of the display image plane on the screen SCR as described above.

Figure 6A:
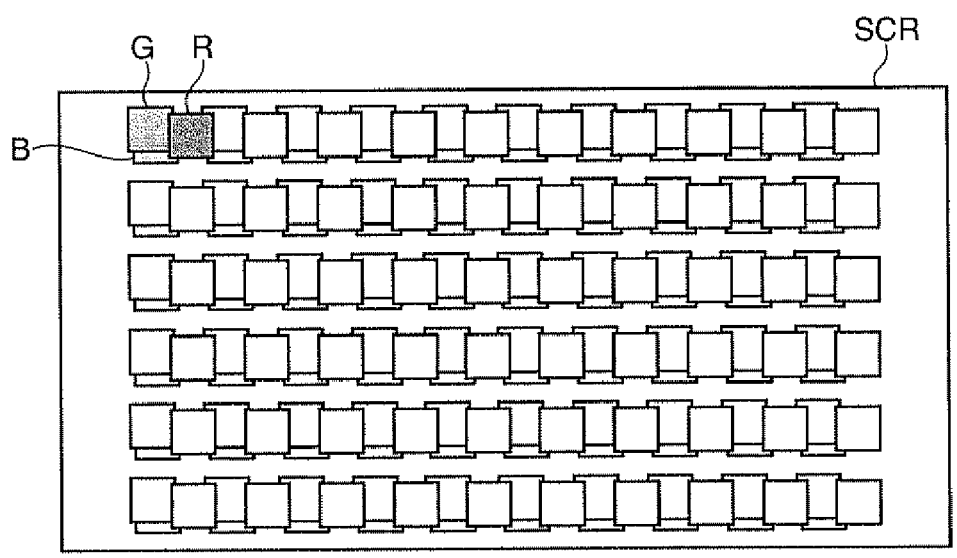
FIGS. 6A and 6B are explanatory diagrams of a projection image plane on a screen in the case in which a pixel value correction process in the image processing section of the present embodiment is not executed.
Figure 6B:
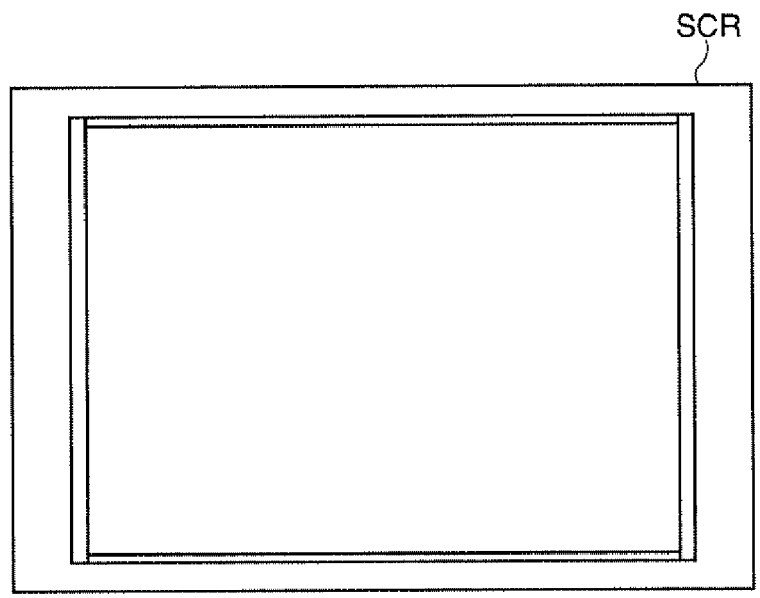

FIGS. 6A and 6B show explanatory diagrams of the projection image plane on the screen SCR in the case in which the pixel value correction process in the image processing section 200 of the present embodiment is not executed. FIG. 6A schematically shows the condition in which the projection is performed on the screen SCR without correcting the pixel value of the sub-pixel in the condition in which the display position of the display sub-pixel constituting the display pixel in the projection image plane. It should be noted that FIG. 6A is illustrated assuming that the display sub-pixels constituting the display pixel are displaced uniformly in the image plane for the sake of convenience of explanations. FIG. 6B schematically shows the aspect of the projection image plane on the screen SCR.

Figure 7A:
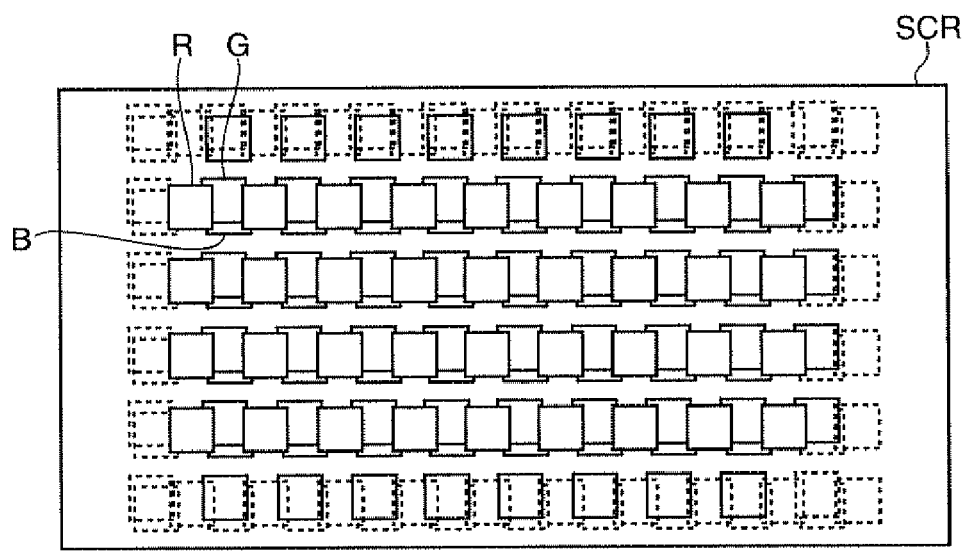
FIGS. 7A and 7B are explanatory diagrams of a projection image plane on the screen in the case in which the pixel value correction process in the image processing section of the present embodiment is executed.
Figure 7B:
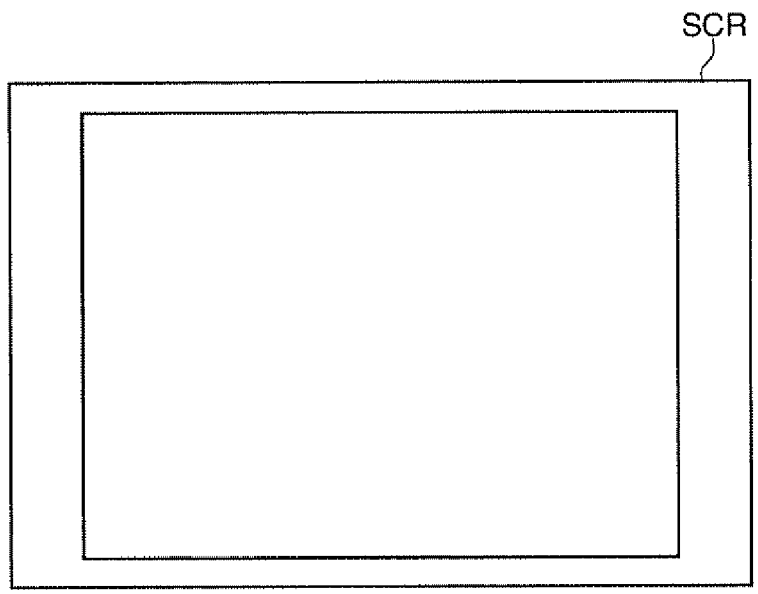

FIGS. 7A and 7B show explanatory diagrams of the projection image plane on the screen SCR in the case in which the pixel value correction process in the image processing section 200 of the present embodiment is executed. FIG. 7A schematically shows the condition in which the projection is performed on the screen SCR without correcting the pixel value of the sub-pixel in the condition in which the display position of the display sub-pixel constituting the display pixel in the projection image plane. It should be noted that FIG. 7A is illustrated assuming that the display sub-pixels constituting the display pixel are displaced uniformly in the image plane for the sake of convenience of explanations. FIG. 7B schematically shows the aspect of the projection image plane of the screen SCR.

It is assumed that the display position of the R component display sub-pixel, the display position of the G component display sub-pixel, and the display position of the B component display sub-pixel are shifted from each other as shown in FIG. 6A, and the B component display sub-pixel is shifted rightward in the display image plane DSP. Further, as shown in FIG. 6A, it is assumed that the display position of the B component display sub-pixel is shifted downward in the display image plane DSP.

In this case, even in the case in which an all-white image is projected on the screen SCR, there appear, as the false colors, cyan at the left end out of the ends of the projection image plane, red at the right end thereof, red and blue at the lower end, and yellow at the upper end as shown in FIG. 6B.

In contrast, according to the present embodiment, by performing the correction of the pixel value as described above with respect to the ends of the display image plane (projection image plane) DSP, even in the case in which the display position of the R component display sub-pixel, the display position of the G component display sub-pixel, and the display position of the B component display sub-pixel are shifted from each other as shown in FIG. 7A, the false color can be prevented from occurring as shown in FIG. 7B. Therefore, according to the present embodiment, degradation in the feeling of resolution and generation of the false color can be eliminated in the display image on the screen SCR, and therefore, it becomes possible to prevent the degradation in the image quality even in the case in which the display position of the display sub-pixel corresponding to the sub-pixel is displaced.

Hereinafter, a processing example of the image processing section 200 capable of performing such a correction of the pixel value will be explained in detail.

Figure 8:
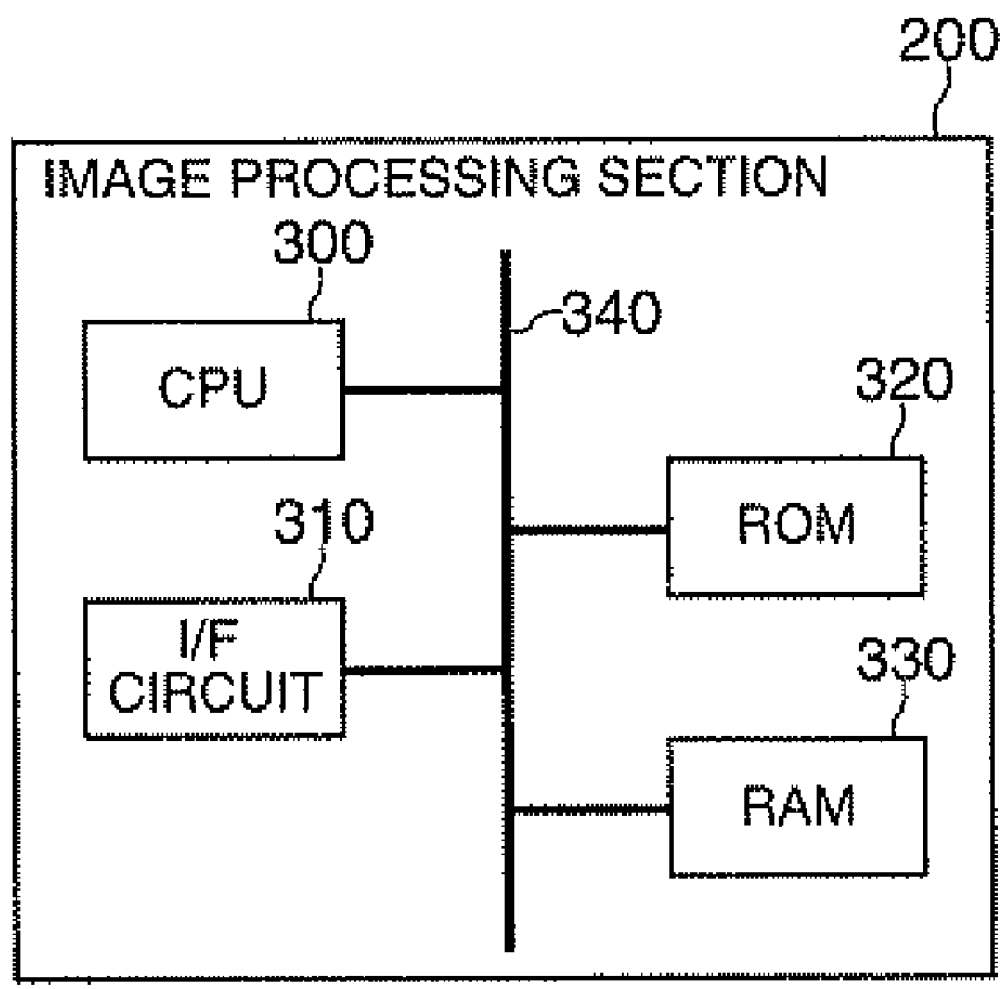
FIG. 8 is a block diagram of a hardware configuration example of the image processing section shown in FIG. 1.

FIG. 8 shows a block diagram of a hardware configuration example of the image processing section 200 shown in FIG. 1.

The image processing section 200 has a CPU 300, an I/F circuit 310, a read only memory (ROM) 320, a random access memory (RAM) 330, and a bus 340, and the CPU 300, the I/F circuit 310, the ROM 320, and the RAM 330 are electrically connected to each other via the bus 340.

For example, the ROM 320 or the RAM 330 stores a program for realizing the function of the image processing section 200. The CPU 300 reads out the program stored in the ROM 320 or the RAM 330 to execute the process corresponding to the program, thereby realizing the function of the image processing section 200 described above with a software process. Specifically, the processing of the pixel value correction section 220 shown in FIG. 1 is realized by the CPU 300 reading the program stored in the ROM 320 or the RAM 330 and performing the process corresponding to the program. It should be noted that the RAM 330 is used as a working area for the process by the CPU 300, realizes the function of the displacement amount storage section 210, and is used as a buffer area of the I/F circuit 310 and the ROM 320. Further, it is also possible that the ROM 320 realizes the function of the displacement amount storage section 210 shown in FIG. 1. The I/F circuit 310 performs an input interface process of the image signal from an image signal generation device not shown in the drawings.

Figure 9:
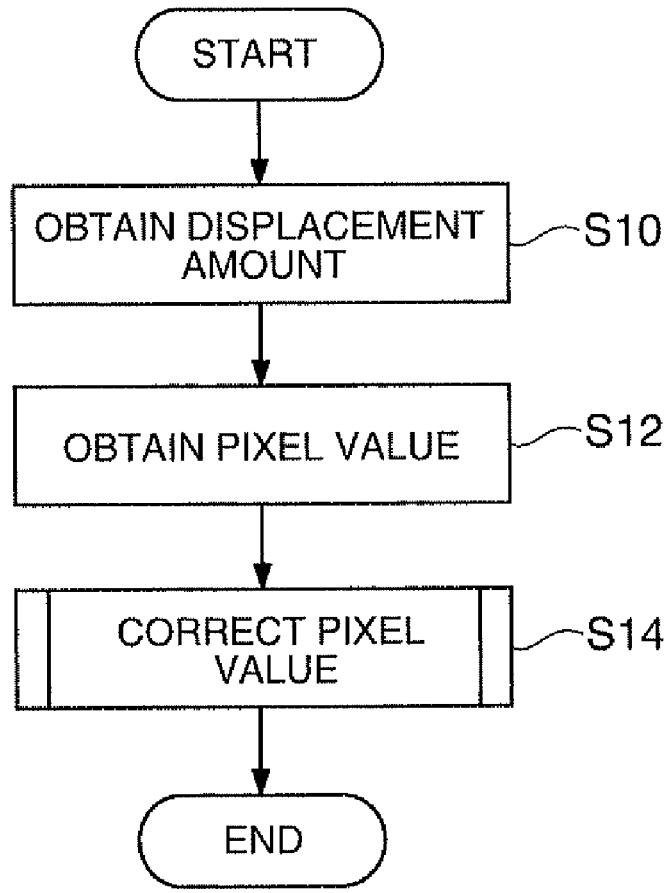
FIG. 9 is a flowchart of a processing example of the image processing section shown in FIG. 1.

FIG. 9 shows a flowchart of a processing example of the image processing section 200 shown in FIG. 1. The ROM 320 or the RAM 330 shown in FIG. 8, for example, stores the program for realizing the process shown in FIG. 9, and the process shown in FIG. 9 can be realized with a software process by the CPU 300 reading out the program stored in the ROM 320 or the RAM 330 to execute the process corresponding to the program.

Firstly, the image processing section 200 obtains the displacement amount stored in the displacement amount storage section 210 as a displacement amount obtaining step (step S10). More specifically, the image processing section 200 obtains the displacement amount corresponding to the pixel of the processing object in advance of the correction process of the pixel value. For example, the displacement amount storage section 210 stores only the displacement amount corresponding to some discrete display pixels out of all of the display pixels on the projection image plane to the screen SCR, and the displacement amount of the display pixel corresponding to the process object pixel is obtained by the image processing section 200 interpolating the displacement amounts read out from the displacement amount storage section 210. Further, it is also possible that, for example, the displacement amount storage section 210 stores the displacement amounts corresponding respectively to all of the display pixels on the projection image plane to the screen SCR, and the image processing section 200 reads out the displacement amount corresponding to the process object.

Subsequently, the image processing section 200 obtains the pixel value of the pixel of the process object or a pixel in the periphery thereof as the pixel value obtaining step (step S12). Further, the image processing section 200 corrects the pixel value of the pixel of the process object in accordance with the displacement amount of the display sub-pixel for every sub-pixel as the pixel value correction step (step S14), and outputs the pixel value thus corrected to the image display section 100 to terminate the series of processes (END).

Figure 10:
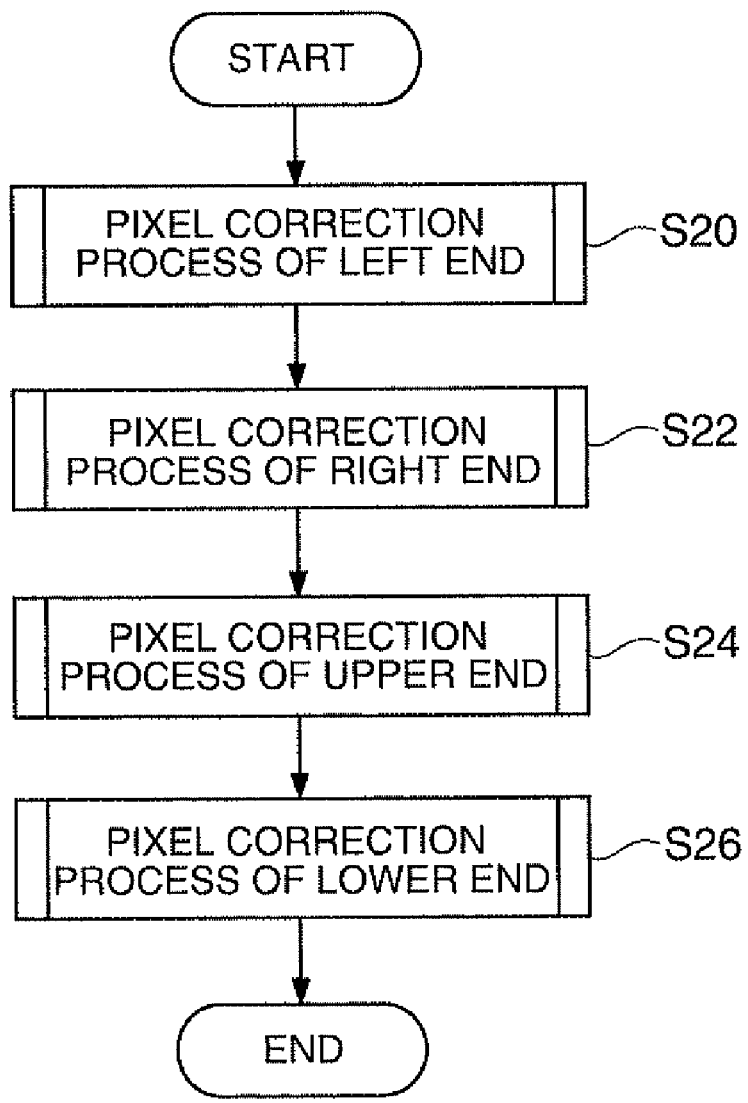
FIG. 10 is a flowchart of a processing example of the step S14 shown in FIG. 9.

FIG. 10 shows a flowchart of a processing example of the step S14 shown in FIG. 9. The ROM 320 or the RAM 330 shown in FIG. 8, for example, stores the program for realizing the process shown in FIG. 10, and the process shown in FIG. 10 can be realized with a software process by the CPU 300 reading out the program stored in the ROM 320 or the RAM 330 to execute the process corresponding to the program.

The image processing section 200 firstly, as the left end correction step, performs the correction process of the pixels at the left end (the leftmost end) of the display image plane DSP (step S20). Here, the pixels at the left end denotes, for example, a pixel group connecting the pixel at the pixel position P1 and the pixel at the pixel position P3 shown in FIG. 3, and constitutes the pixels at the left end of the display image plane DSP.

Subsequently, as the right end correction step, the image processing section 200 performs the correction process of the pixels at the right end (the rightmost end) of the display image plane DSP (step S22). Here, the pixels at the right end denotes, for example, a pixel group connecting the pixel at the pixel position P2 and the pixel at the pixel position P4 shown in FIG. 3, and constitutes the pixels at the right end of the display image plane DSP.

Subsequently, as the upper end correction step, the image processing section 200 performs the correction process of the pixels at the upper end (the uppermost end) of the display image plane DSP (step S24). Here, the pixels at the upper end denotes, for example, a pixel group connecting the pixel at the pixel position P1 and the pixel at the pixel position P2 shown in FIG. 3, and constitutes the pixels at the upper end of the display image plane DSP.

Subsequently, as the lower end correction step, the image processing section 200 performs the correction process of the pixels at the lower end (the lowermost end) of the display image plane DSP (step S26), and terminates the series of processes (END) Here, the pixels at the lower end denotes, for example, a pixel group connecting the pixel at the pixel position P3 and the pixel at the pixel position P4 shown in FIG. 3, and constitutes the pixels at the lower end of the display image plane DSP.

It should be noted that the present embodiment is not limited to what performs processing in the order as explained with reference to FIG. 10 in the step S14 shown in FIG. 9, but it is also possible to perform the processing in an order other than the order as explained with reference to FIG. 10.

Since the steps S20, S22, S24, and S26 shown in FIG. 10 are substantially the same processes except the selection order of the pixel of the process object and the peripheral pixel used for the interpolation process of that process, a processing example with respect to the step S20 shown in FIG. 10 will hereinafter be explained.

Figure 11:
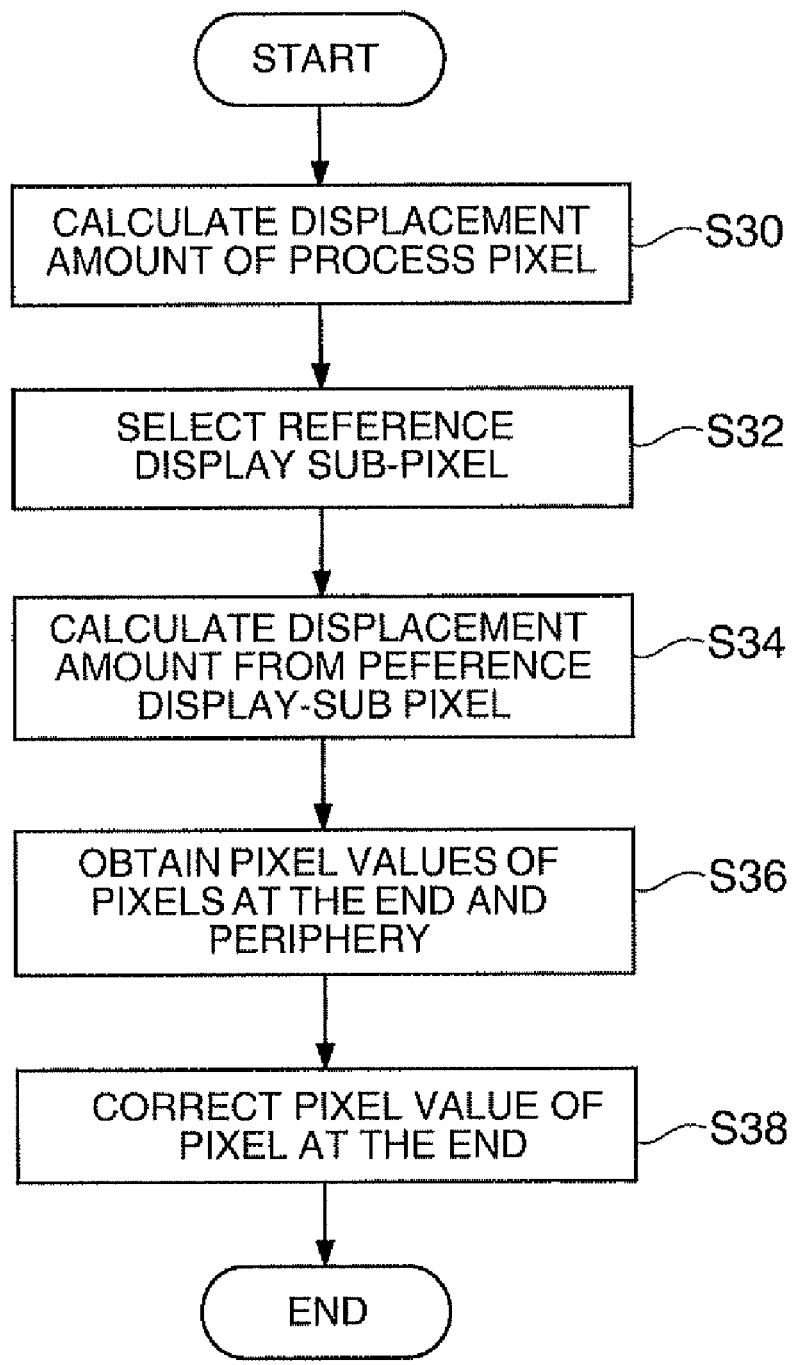
FIG. 11 is a flowchart of a processing example of the step S20 shown in FIG. 10.

FIG. 11 shows a flowchart of a processing example of the step S20 shown in FIG. 10. The ROM 320 or the RAM 330 shown in FIG. 8, for example, stores the program for realizing the process shown in FIG. 11, and the process shown in FIG. 11 can be realized with a software process by the CPU 300 reading out the program stored in the RON 320 or the RAM 330 to execute the process corresponding to the program.

Here, it is assumed that the displacement amount storage section 210 stores only the displacement amounts of the pixel positions P1 through P4 as shown in FIGS. 3 and 4. On this occasion, the pixel value correction section 220 of the image processing section 200 calculates the displacement amount of the pixel (processing pixel) of the process object in, for example, the display sub-pixel displacement amount calculation section 224 shown in FIG. 5 as the processing pixel displacement amount calculation step (step S30).

Figure 12:
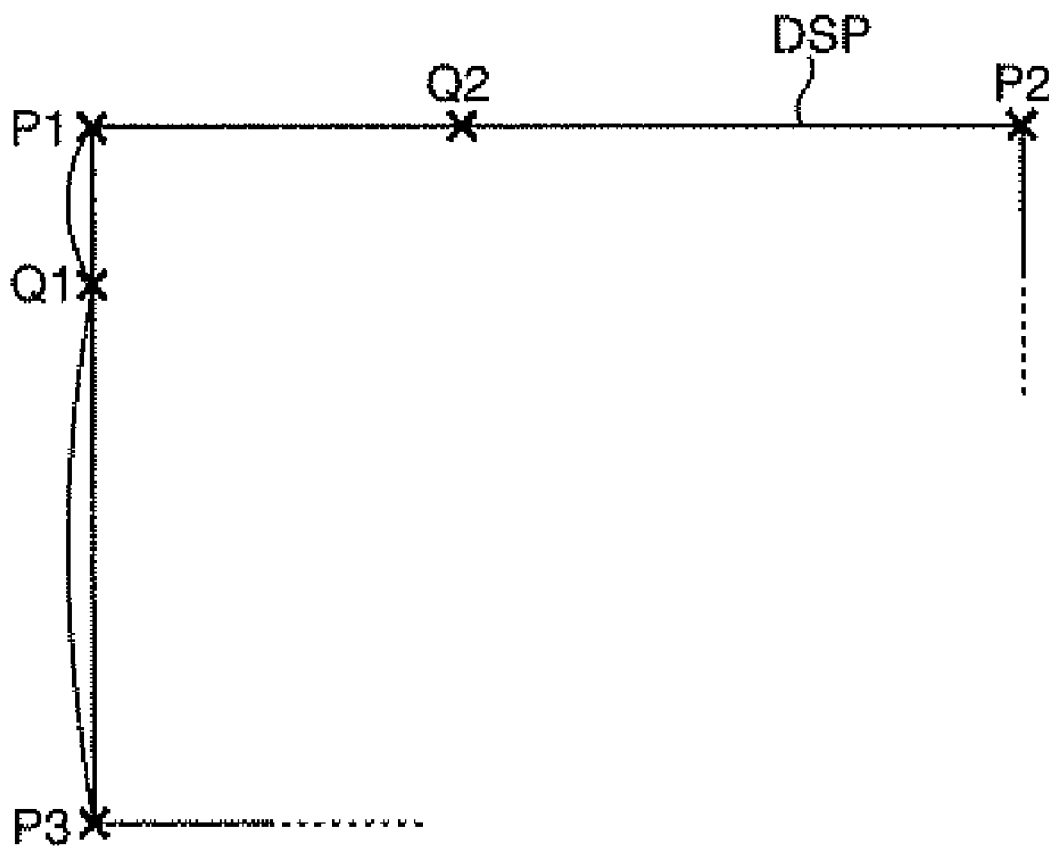
FIG. 12 is an explanatory diagram of a process of the step S30 shown in FIG. 11.

FIG. 12 shows an explanatory diagram of the process of the step S30 shown in FIG. 11.

Figure 13:
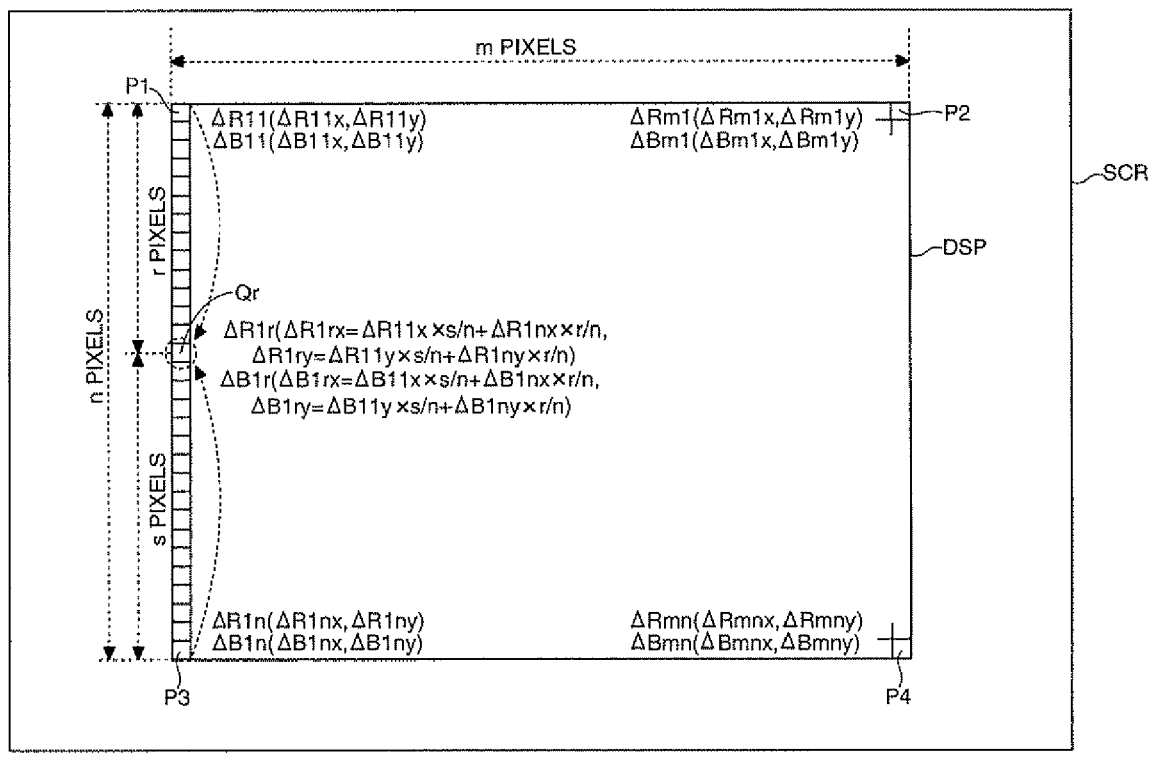
FIG. 13 is an explanatory diagram of a detailed processing example of the step S30 shown in FIG. 11.

FIG. 13 shows a detailed process example of the step S30 shown in FIG. 11.

In the step S30 shown in FIG. 11, the display sub-pixel displacement amount calculation section 224 of the pixel value correction section 220 calculates the displacement amount of the display sub-pixel constituting the display pixels forming the left end of the display image plane DSP using the displacement amounts corresponding to the display pixels at the pixel positions P1, P3 stored in the displacement amount storage section 210. For example, the displacement amount of the display sub-pixel constituting the display pixel Q1 shown in FIG. 12 constituting the left end is calculated by the linear interpolation using the displacement amount corresponding to the display sub-pixel constituting the display pixel at the pixel position P1 and the displacement amount corresponding to the display sub-pixel constituting the display pixel at the pixel position P3 with respect to each of the horizontal direction and the vertical direction.

Here, an example of calculating the displacement amount corresponding to the pixel at the pixel position Qr located by r pixels distant vertically in the positive direction (downward) from the origin of the pixel (the pixel at the pixel position P1) at the upper left of the display image plane DSP will be explained with reference to FIG. 13. The pixel position Qr is assumed to be located by s pixels distant in the negative direction (upward) from the pixel position P3.

In the case of calculating the displacement amount at the pixel position Qr shown in FIG. 13 out of the pixels constituting the left end of the display image plane DSP, the display sub-pixel displacement amount calculation section 224 performs the interpolation process using the displacement amounts $\Delta R11$, $\Delta B11$ (based on the G component display sub-pixel) corresponding to the pixel at the pixel position P1 and the displacement amounts $\Delta R1n$, $\Delta B1n$ corresponding to the pixel at the pixel position P3, thereby calculating the displacement amounts $\Delta R1r$, $\Delta B1r$ of the display sub-pixels constituting the display pixel at the pixel position Qr. Here, the displacement amount $\Delta R1r$ includes the displacement amount $\Delta R1rx$ in the x direction (horizontal direction) and the displacement amount $\Delta R1ry$ in the y direction (vertical direction), and is obtained as the following formulas.

$$\Delta R1rx = \Delta R11x \times s/n + \Delta R1nx \times r/n \quad (1)$$

$$\Delta R1ry = \Delta R11y \times s/n + \Delta R1ny \times r/n \quad (2)$$

Further, the displacement amount $\Delta B1r$ includes the displacement amount $\Delta B1rx$ in the x direction and the displacement amount $\Delta B1ry$ in the y direction, and is obtained as the following formulas.

$$\Delta B1rx = \Delta B11x \times s/n + \Delta B1nx \times r/n \quad (3)$$

$$\Delta B1ry = \Delta B11y \times s/n + \Delta B1ny \times r/n \quad (4)$$

It should be noted that in the case of performing the correction process of the pixels at the upper end of the display image plane DSP in, for example, the step S24 shown in FIG. 10, the displacement amounts of the display sub-pixels constituting the display pixels constituting the upper end of the display image plane DSP are calculated using the displacement amounts corresponding to the display pixels at the pixel positions P1, P2 stored in the displacement amount storage section 210.

In FIG. 11, when the display sub-pixel displacement amount calculation section 224 calculates the displacement amount of the processing pixel as described above, as the reference display sub-pixel selection step, the pixel value correction section 220 selects the nearest display sub-pixel to the center C1 of the display image plane DSP in the horizontal direction among the plurality of display sub-pixels constituting the display pixels in the left end (the end) as the reference display sub-pixel (step S32).

Figure 14:
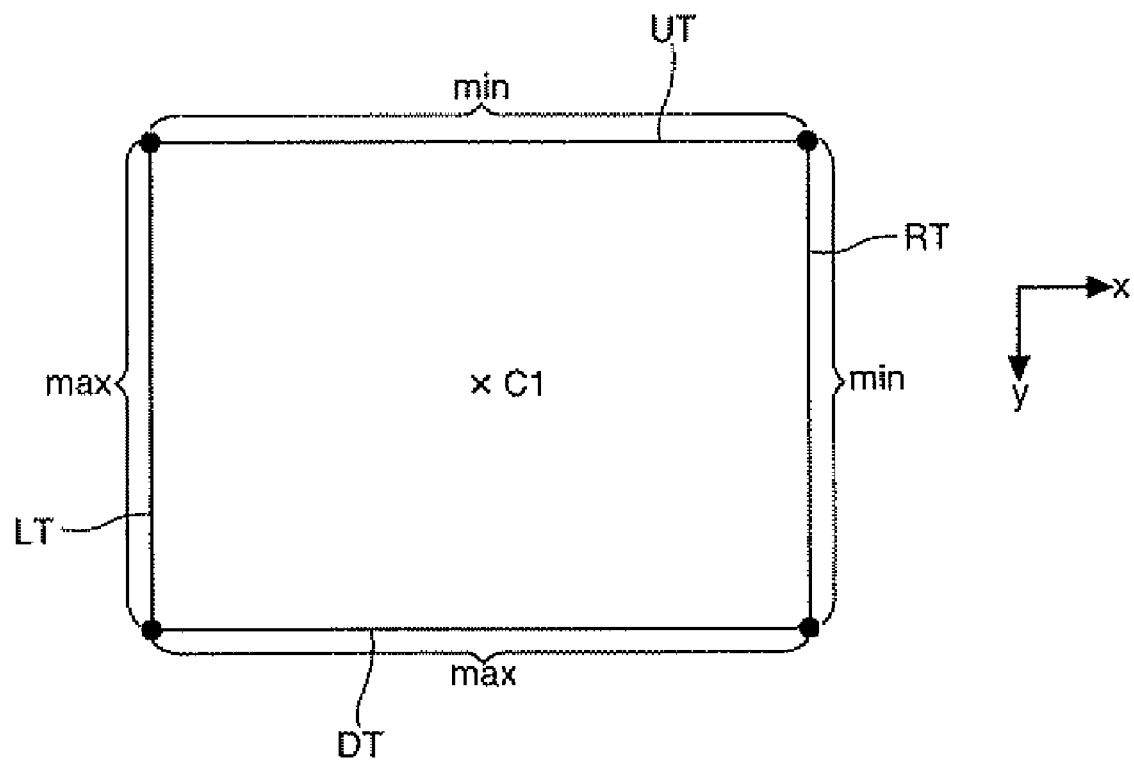
FIG. 14 is an explanatory diagram of the step S32 shown in FIG. 11.

FIG. 14 shows an explanatory diagram of the step S32 shown in FIG. 11.

In the step S30 shown in FIG. 11, the displacement amounts of the display positions of the display sub-pixels of the R component and the B component constituting the display pixels at the left end LT are obtained based on the display position of the G component display sub-pixel. Therefore, when the direction from the pixel position P1 to the pixel position P2 is defined as the positive direction (negative direction), the display sub-pixel having the displacement amount taking the maximum value (the minimum value) among the displacement amounts of "0" as the displacement amount of the G component display sub-pixel and the displacement amounts obtained in the step S30 becomes the reference display sub-pixel. In other words, the reference display sub-pixel selection section 222 selects the G component display sub-pixel as the reference display sub-pixel when "0" is the maximum value among "0" and the displacement amounts obtained in the step S30, selects the R component display sub-pixel as the reference display sub-pixel when the displacement amount of the R component sub-pixel is the maximum value, and selects the B component display sub-pixel as the reference display sub-pixel when the displacement amount of the B component sub-pixel is the maximum value.

It should be noted that in the case of defining the direction from the pixel position P1 to the pixel position P2 as the positive direction (negative direction), when executing the correction process of the pixels in the right end RT of the display image plane DSP in, for example, the step S22 shown in FIG. 10, the reference display sub-pixel selection section 222 selects the display sub-pixel, which has the displacement amount taking the minimum value (maximum value) among "0" as the displacement amount of the C component display sub-pixel and the displacement amounts in the horizontal direction obtained in the step S30, as the reference display sub-pixel.

Further, in the case of defining the direction from the pixel position P1 to the pixel position P3 as the positive direction (negative direction), when executing the correction process of the pixels in the upper end UT of the display image plane DSP in, for example, the step S24 shown in FIG. 10, the reference display sub-pixel selection section 222 selects the display sub-pixel, which has the displacement amount taking the minimum value (maximum value) among "0" as the displacement amount of the G component display sub-pixel and the displacement amounts in the vertical direction obtained in the step S30, as the reference display sub-pixel.

Still further, in the case of defining the direction from the pixel position P1 to the pixel position P3 as the positive direction (negative direction), when executing the correction process of the pixels in the lower end DT of the display image plane DSP in, for example, the step S26 shown in FIG. 10, the reference display sub-pixel selection section 222 selects the display sub-pixel, which has the displacement amount taking the maximum value (minimum value) among "0" as the displacement amount of the G component display sub-pixel and the displacement amounts in the vertical direction obtained in the step S30, as the reference display sub-pixel.

In FIG. 11, when the reference display sub-pixel selection section 222 selects the reference display sub-pixel as described above, the display sub-pixel displacement amount calculation section 224 calculates, as the display sub-pixel displacement amount calculation step, the displacement amounts of the remaining display sub-pixels except the reference display sub-pixel among the plurality of display sub-pixels constituting the display pixels at the left end based on the displacement amounts stored in the displacement amount storage section 210 taking the display position of the reference display sub-pixel selected by the reference display sub-pixel selection section 222 as the reference (step S34).

Further, the pixel value correction operation section 226 of the pixel value correction section 220 obtains the pixel values corresponding to the sub-pixels at the left end and the pixel values corresponding to the sub-pixels in the peripheral area thereof (step S36). Subsequently, the pixel value correction operation section 226 corrects the pixel values of the sub-pixels corresponding to the remaining display sub-pixels except the reference display sub-pixel out of the plurality of display sub-pixels constituting the display pixel at the left end based on the displacement amount calculated by the display sub-pixel displacement amount calculation section 224 (step S38), and then terminates the series of processes (END).

FIGS. 15A, 15B, 15C, and 15D are explanatory diagrams of the steps S32 through S38 shown in FIG. 11. FIGS. 15A through 15D exemplify the correction process of the sub-pixels constituting the pixel (1,2) surrounded by the dotted circle among the pixels in the vicinity of the pixel position P1 for the sake of simplicity of the explanations. In FIGS. 15A through 15D, the R component display sub-pixels are represented by "●" marks, the G component display sub-pixels are represented by "×" marks, and the B component display sub-pixels are represented by "▲" marks.

Figure 15A:
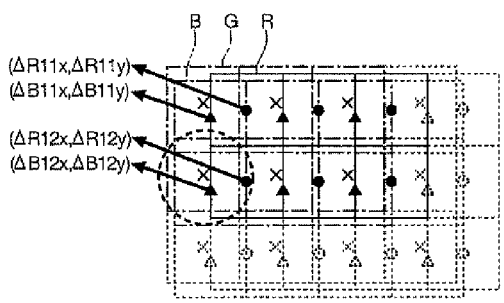
FIGS. 15A, 15B, 15C, and 15D are explanatory diagrams of the steps S32 through S38 shown in FIG. 11.

After calculating the displacement amount of the process pixel in the step S30 shown in FIG. 11, the reference display sub-pixel selection section 222 selects the reference display sub-pixel in accordance with the result of a function max (ΔR12x,ΔB12x,0) (the function max is a function for obtaining the maximum value of the arguments). Here, as shown in FIG. 15A, the reference display sub-pixel is set to be the R component display sub-pixel.

Figure 15B:
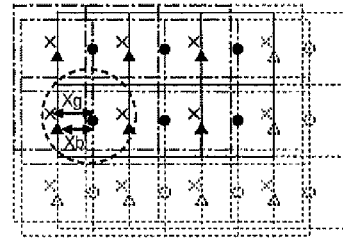

Subsequently, the display sub-pixel displacement amount calculation section 224 obtains the displacement amount of the G component display sub-pixel and the displacement amount of the B component display sub-pixel based on the R component display sub-pixel as the reference display sub-pixel. In FIG. 15B, it is assumed that the displacement amount of the G component in the x direction is Xg, the displacement amount of the G component in the y direction is Yg, the displacement amount of the B component in the x direction is Xb, and the displacement amount of the B component in the y direction is Yb. It should be noted that in FIG. 15B, only the displacement amounts in the x direction are illustrated.

As a result, the displacement amounts which the display sub-pixel displacement amount calculation section 224 obtains are as follows.

$$Xg = -\Delta R12x \quad (5)$$

$$Yg = -\Delta R12y \quad (6)$$

$$Xb = -\Delta R12x + \Delta B12x \quad (7)$$

$$Yb = -\Delta R12y + \Delta B12y \quad (8)$$

Figure 15C:
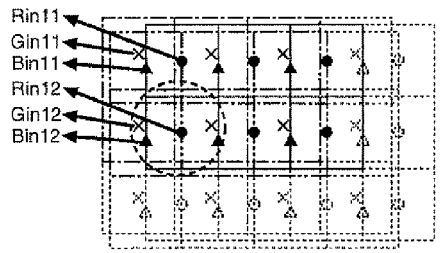

Subsequently, as shown in FIG. 15C, the pixel value correction operation section 226 obtains the pixel values corresponding to the display sub-pixels constituting the display pixel and the pixel values corresponding to the display sub-pixels constituting the display pixel in the periphery of the display pixel. Here, the pixel values corresponding to the display sub-pixels constituting the display pixel are assumed to be Rin12, Gin12, and Bin12.

Figure 15D:
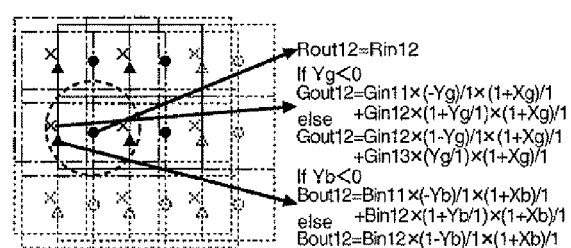

Further, as shown in FIG. 15D, the pixel value correction operation section 226 directly outputs the R component sub-pixel selected as the reference display sub-pixel without the correction while executing the correction of the G component sub-pixel and the B component sub-pixel. It should be noted that the sub-pixels constituting the peripheral pixels used for the interpolation process are made different between the G component and the B component in accordance with the sign of Yg and the sign of Yb.

For example, assuming that the pixel pitch is "1," and the displacement amount of the sub-pixel is smaller than 1, the G component pixel value is corrected to have the following value after the correction when Yg<0 is satisfied.

$$Gout12 = Gin11 \times (-Yg) \times (1+Xg) + Gin12 \times (1+Yg) \times (1+Xg) \quad (9)$$

Further, when Yg>0 is satisfied, the G component pixel value is corrected to have the following value after the correction.

$$Gout12 = Gin12 \times (1-Yg) \times (1+Xg) + Gin13 \times (Yg) \times (1+Xg) \quad (10)$$

The pixel value correction operation section 226 obtains the pixel value of the sub-pixel after the correction with respect also to the B component similarly to the case with the G component. Specifically, when Yb<0 is satisfied, the B component pixel value is corrected to have the following value after the correction.

$$Bout12 = Bin11 \times (-Yb) \times (1+Xb) + Bin12 \times (1+Yb) \times (1+Xb) \quad (11)$$

Further, when Yb>0 is satisfied, the B component pixel value is corrected to have the following value after the correction.

$$Bout12 = Bin12 \times (1-Yb) \times (1+Xb) + Bin13 \times (Yb) \times (1+Xb) \quad (12)$$

As described above, as shown in the step S20 of FIG. 10, it is possible to correct the pixel values of the sub-pixels constituting the pixels at the left end of the display image plane DSP in accordance with the displacement amounts of the display sub-pixels corresponding to the sub-pixels.

FIGS. 16A, 16B, 16C, and 16D are explanatory diagrams of the process for correcting the pixel values of the sub-pixels constituting the pixels at the right end of the display image plane DSP. FIGS. 16A through 16D correspond to the processes of the steps S32 through S38 shown in FIG. 11 in the case in which the pixel values of the sub-pixels constituting the pixels at the right end of the display image plane DSP are corrected. FIGS. 16A through 16D exemplify the correction process of the sub-pixels constituting the pixel (m,2) surrounded by the dotted circle among the pixels in the vicinity of the pixel position P2 for the sake of simplicity of the explanations. In FIGS. 16A through 16D, the R component display sub-pixels are represented by "●" marks, the G component display sub-pixels are represented by "×" marks, and the B component display sub-pixels are represented by "▲" marks.

Figure 16A:
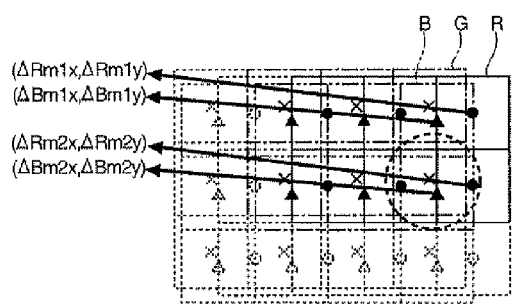
FIGS. 16A, 16B, 16C, and 16D are explanatory diagrams of a process for correcting the pixel values of the sub-pixels constituting the pixels at the right end of the display image plane.

After calculating the displacement amount of the process pixel in the step S30 shown in FIG. 11, the reference display sub-pixel selection section 222 selects the reference display sub-pixel in accordance with the result of a function min ($\Delta Rm2x, \Delta Bm2x, 0$) (the function min is a function for obtaining the minimum value of the arguments). Here, as shown in FIG. 16A, the reference display sub-pixel is set to be the G component display sub-pixel.

Figure 16B:
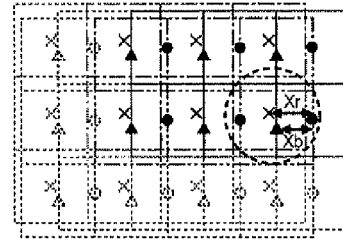

Subsequently, the display sub-pixel displacement amount calculation section 224 obtains the displacement amount of the R component display sub-pixel and the displacement amount of the B component display sub-pixel based on the G component display sub-pixel as the reference display sub-pixel. In FIG. 16B, it is assumed that the displacement amount of the R component in the x direction is Xr, the displacement amount of the R component in the y direction is Yr, the displacement amount of the B component in the x direction is Xb, and the displacement amount of the B component in the y direction is Yb. It should be noted that in FIG. 16B, only the displacement amounts in the x direction are illustrated.

As a result, the displacement amounts which the display sub-pixel displacement amount calculation section 224 obtains are as follows.

$$Xr = \Delta Rm2x \quad (13)$$

$$Yr = \Delta Rm2y \quad (14)$$

$$Xb = \Delta Bm2x \quad (15)$$

$$Yb = \Delta Bm2y \quad (16)$$

Figure 16C:
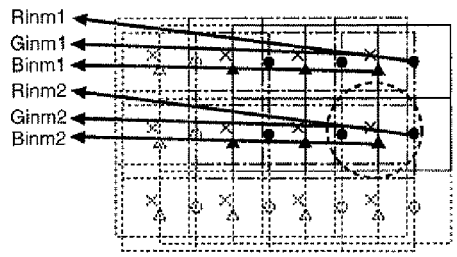

Subsequently, as shown in FIG. 16C, the pixel value correction operation section 226 obtains the pixel values corresponding to the display sub-pixels constituting the display pixel and the pixel values corresponding to the display sub-pixels constituting the display pixel in the periphery of the display pixel. Here, the pixel values corresponding to the display sub-pixels constituting the display pixel are assumed to be Rinm2, Ginm2, and Binm2.

Figure 16D:
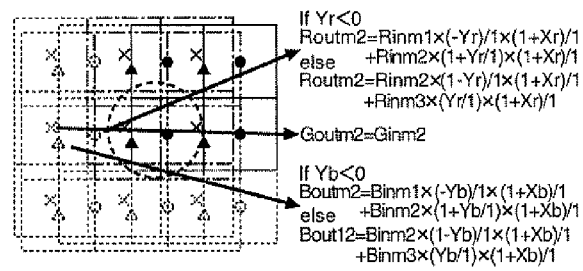

Further, as shown in FIG. 16D, the pixel value correction operation section 226 directly outputs the G component sub-pixel selected as the reference display sub-pixel without the correction while executing the correction of the R component sub-pixel and the B component sub-pixel. It should be noted that the sub-pixels constituting the peripheral pixels used for the interpolation process are made different between the R component and the B component in accordance with the sign of Yr and the sign of Yb.

For example, assuming that the pixel pitch is "1," and the displacement amount of the sub-pixel is smaller than 1, the G component pixel value is corrected to have the following value after the correction when Yr<0 is satisfied.

$$Routm2 = Rinm1 \times (-Yr) \times (1+Xr) + Rinm2 \times (1+Yr) \times (1+Xr) \quad (17)$$

Further, when Yr>0 is satisfied, the R component pixel value is corrected to have the following value after the correction.

$$Routm2 = Rinm2 \times (1-Yr) \times (1+Xr) + Rinm3 \times (Yr) \times (1+Xr) \quad (18)$$

The pixel value correction operation section 226 obtains the pixel value of the sub-pixel after the correction with respect also to the B component similarly to the case with the R component. Specifically, when Yb<0 is satisfied, the B component pixel value is corrected to have the following value after the correction.

$$Boutm2 = Binm1 \times (-Yb) \times (1+Xb) + Binm2 \times (1+Yb) \times (1+Xb) \quad (19)$$

Further, when Yb≧0 is satisfied, the B component pixel value is corrected to have the following value after the correction.

$$Boutm2 = Binm2 \times (1-Yb) \times (1+Xb) + Binm3 \times (Yb) \times (1+Xb) \quad (20)$$

As described above, as shown in the step S22 of FIG. 10, it is possible to correct the pixel values of the sub-pixels constituting the pixels at the right end of the display image plane DSP in accordance with the displacement amounts of the display sub-pixels corresponding to the sub-pixels.

FIGS. 17A, 17B, 17C, and 17D are explanatory diagrams of the process for correcting the pixel values of the sub-pixels constituting the pixels at the upper end of the display image plane DSP. FIGS. 17A through 17D correspond to the processes of the steps S32 through S38 shown in FIG. 11 in the case in which the pixel values of the sub-pixels constituting the pixels at the upper end of the display image plane DSP are corrected. FIGS. 17A through 17D exemplify the correction process of the sub-pixels constituting the pixel (2,2) surrounded by the dotted circle among the pixels in the vicinity of the pixel position P1 for the sake of simplicity of the explanations. In FIGS. 17A through 17D, the R component display sub-pixels are represented by "●" marks, the G component display sub-pixels are represented by "×" marks, and the B component display sub-pixels are represented by "▲" marks.

Figure 17A:
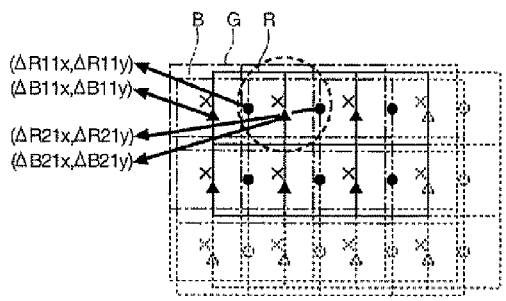
FIGS. 17A, 17B, 17C, and 17D are explanatory diagrams of a process for correcting the pixel values of the sub-pixels constituting the pixels at the upper end of the display image plane.

After calculating the displacement amount of the process pixel in the step S30 shown in FIG. 11, the reference display sub-pixel selection section 222 selects the reference display sub-pixel in accordance with the result of the function max ($\Delta R21y, \Delta B21y, 0$). Here, as shown in FIG. 17A, the reference display sub-pixel is set to be the B component display sub-pixel.

Figure 17B:
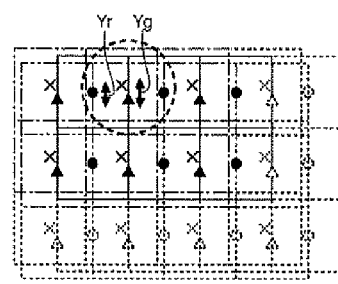

Subsequently, the display sub-pixel displacement amount calculation section 224 obtains the displacement amount of the R component display sub-pixel and the displacement amount of the G component display sub-pixel based on the B component display sub-pixel as the reference display sub-pixel. In FIG. 17B, it is assumed that the displacement amount of the R component in the x direction is Xr, the displacement amount of the R component in the y direction is Yr, the displacement amount of the G component in the x direction is Xg, and the displacement amount of the G component in the y direction is Yg. It should be noted that in FIG. 17B, only the displacement amounts in the y direction are illustrated.

As a result, the displacement amounts which the display sub-pixel displacement amount calculation section 224 obtains are as follows.

$$Xr = -\Delta B21x + \Delta R21x \quad (21)$$

$$Yr = -\Delta B21y + \Delta R21y \quad (22)$$

$$Xg = -\Delta B21x \quad (23)$$

$$Yg = -\Delta B21y \quad (24)$$

Figure 17C:
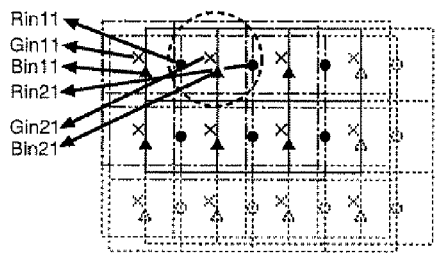
Figure 17D:
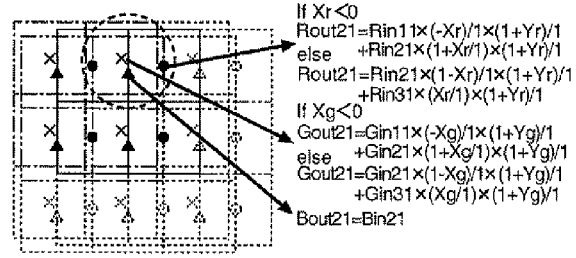

Subsequently, as shown in FIG. 17C, the pixel value correction operation section 226 obtains the pixel values corresponding to the display sub-pixels constituting the display pixel and the pixel values corresponding to the display sub-pixels constituting the display pixel in the periphery of the display pixel. Here, the pixel values corresponding to the display sub-pixels constituting the display pixel are assumed to be Rin21, Gin21 and Bin21.

Further, as shown in FIG. 11D, the pixel value correction operation section 226 directly outputs the B component sub-pixel selected as the reference display sub-pixel without the correction while executing the correction of the R component sub-pixel and the G component sub-pixel. It should be noted that the sub-pixels constituting the peripheral pixels used for the interpolation process are made different between the R component and the G component in accordance with the sign of Xr and the sign of Xg.

For example, assuming that the pixel pitch is "1," and the displacement amount of the sub-pixel is smaller than 1, the R component pixel value is corrected to have the following value after the correction when Xr<0 is satisfied.

$$Rout21 = Rin11 \times (-Xr) \times (1+Yr) + Rin21 \times (1+Xr) \times (1+Yr) \quad (25)$$

Further, when Xr≧0 is satisfied, the R component pixel value is corrected to have the following value after the correction.

$$Rout21 = Rin21 \times (1-Xr) \times (1+Yr) + Rin31 \times (Xr) \times (1+Yr) \quad (26)$$

The pixel value correction operation section 226 obtains the pixel value of the sub-pixel after the correction with respect also to the G component similarly to the case with the R component. Specifically, when Xg<0 is satisfied, the G component pixel value is corrected to have the following value after the correction.

$$Gout21 = Gin11 \times (-Xg) \times (1+Yg) + Gin21 \times (1+Xg) \times (1+Yg) \quad (27)$$

Further, when Xg≧0 is satisfied, the G component pixel value is corrected to have the following value after the correction.

$$Gout21\,Gin21 \times (1-Xg) \times (1+Yg) + Gin31 \times (Xg) \times (1+Yg) \quad (28)$$

As described above, as shown in the step S24 of FIG. 10, it is possible to correct the pixel values of the sub-pixels constituting the pixels at the upper end of the display image plane DSP in accordance with the displacement amounts of the display sub-pixels corresponding to the sub-pixels.

FIGS. 18A, 18B, 18C, and 18D are explanatory diagrams of the process for correcting the pixel values of the sub-pixels constituting the pixels at the lower end of the display image plane DSP. FIGS. 18A through 18D correspond to the processes of the steps S32 through S38 shown in FIG. 11 in the case in which the pixel values of the sub-pixels constituting the pixels at the lower end of the display image plane DSP are corrected. FIGS. 18A through 18D exemplify the correction process of the sub-pixels constituting the pixel (2,n) surrounded by the dotted circle among the pixels in the vicinity of the pixel position P3 for the sake of simplicity of the explanations. In FIGS. 18A through 18D, the R component display sub-pixels are represented by "●", marks, the C component display sub-pixels are represented by "×" marks, and the B component display sub-pixels are represented by "▲" marks.

Figure 18A:
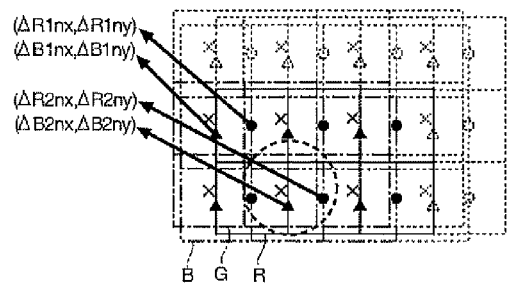
FIGS. 18A, 18B, 18C, and 18D are explanatory diagrams of a process for correcting the pixel values of the sub-pixels constituting the pixels at the lower end of the display image plane.

After calculating the displacement amount of the process pixel in the step S30 shown in FIG. 11, the reference display sub-pixel selection section 222 selects the reference display sub-pixel in accordance with the result of the function min (ΔR2ny,ΔB2ny,0). Here, as shown in FIG. 18A, the reference display sub-pixel is set to be the G component display sub-pixel.

Figure 18B:
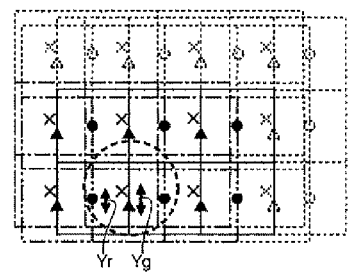

Subsequently, the display sub-pixel displacement amount calculation section 224 obtains the displacement amount of the R component display sub-pixel and the displacement amount of the B component display sub-pixel based on the G component display sub-pixel as the reference display sub-pixel. In FIG. 18B, it is assumed that the displacement amount of the R component in the x direction is Xr, the displacement amount of the R component in the y direction is Yr, the displacement amount of the B component in the x direction is Xb, and the displacement amount of the B component in the y direction is Yb. It should be noted that in FIG. 18B, only the displacement amounts in the y direction are illustrated.

As a result, the displacement amounts which the display sub-pixel displacement amount calculation section 224 obtains are as follows.

$$Xr = \Delta R2nx \quad (29)$$

$$Yr = \Delta R2ny \quad (30)$$

$$Xb = \Delta B2nx \quad (31)$$

$$Yb = \Delta B2ny \quad (32)$$

Figure 18C:
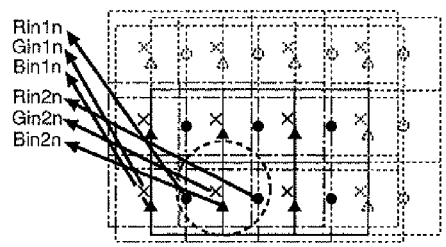

Subsequently, as shown in FIG. 18C, the pixel value correction operation section 226 obtains the pixel values corresponding to the display sub-pixels constituting the display pixel and the pixel values corresponding to the display sub-pixels constituting the display pixel in the periphery of the display pixel. Here, the pixel values corresponding to the display sub-pixels constituting the display pixel are assumed to be Rin2n, Gin2n, and Bin2n.

Figure 18D:
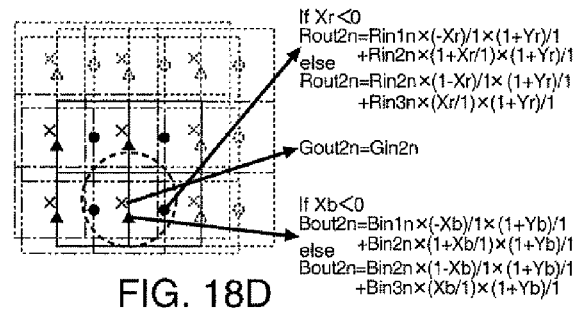

Further, as shown in FIG. 18D, the pixel value correction operation section 226 directly outputs the G component sub-pixel selected as the reference display sub-pixel without the correction while executing the correction of the R component sub-pixel and the B component sub-pixel. It should be noted that the sub-pixels constituting the peripheral pixels used for the interpolation process are made different between the R component and the B component in accordance with the sign of Xr and the sign of Xb.

For example, assuming that the pixel pitch is "1," and the displacement amount of the sub-pixel is smaller than 1, the R component pixel value is corrected to have the following value after the correction when Xr<0 is satisfied.

$$Rout2n = Rin1n \times (-Xr) \times (1+Yr) + Rin2n \times (1+Xr) \times (1+Yr) \quad (33)$$

Further, when Xr≧0 is satisfied, the R component pixel value is corrected to have the following value after the correction.

$$Rout2n = Rin2n \times (1-Xr) \times (1+Yr) + Rin3n \times (Xr) \times (1+Yr) \quad (34)$$

The pixel value correction operation section 226 obtains the pixel value of the sub-pixel after the correction with respect also to the B component similarly to the case with the R component. Specifically, when Xb<0 is satisfied, the B component pixel value is corrected to have the following value after the correction.

$$Bout2n = Bin1n \times (-Xb) \times (1+Yb) + Bin2n \times (1+Xb) \times (1+Yb) \quad (35)$$

Further, when $Xb \geqq 0$ is satisfied, the B component pixel value is corrected to have the following value after the correction.

$$Bout2n = Bin2n \times (1-Xb) \times (1+Yb) + Bin3n \times (Xb) \times (1+Yb) \quad (36)$$

As described above, as shown in the step S26 of FIG. 10, it is possible to correct the pixel values of the sub-pixels constituting the pixels at the lower end of the display image plane DSP in accordance with the displacement amounts of the display sub-pixels corresponding to the sub-pixels.

As explained hereinabove, in the present embodiment, since the pixel values of the sub-pixels can be corrected in accordance with the amount of the displacement of the display positions of the display sub-pixels even in the case in which the displacement occurs in the display positions of the display sub-pixels constituting the display pixels on the screen due to the color aberration of the optical system of the projector or the adjustment accuracy of the position adjustment section for the components of the optical system, the generation of the false color due to the displacement of the display positions can be suppressed. Therefore, according to the present embodiment, it becomes possible to suppress the degradation in the image quality of the display image due to the displacement of the display positions of the display sub-pixels.

Although the image processing device, the image display apparatus, and the image processing method according to the embodiment of the invention are explained hereinabove, the invention is not limited to the embodiment described above, but can be put into practice in various forms within the scope or the spirit of the invention, and the following modifications, for example, are also possible.

1. Although in the embodiment described above the explanations are presented assuming that one pixel is composed of the sub-pixels corresponding respectively to three color components, the invention is not limited to this configuration. The number of color components constituting the pixel can be two or more than three.

2. Although in the embodiment described above the explanations are presented assuming that the displacement amount of the display position of the R component display sub-pixel and the displacement amount of the display position of the B component display sub-pixel are stored in the displacement amount storage section based on the display position of the G component display sub-pixel, the invention is not limited to this configuration. For example, it is also possible to take the display positions of the R component display sub-pixels or the display positions of the B component display sub-pixels as the reference for storing the displacement amounts of the display positions of the display sub-pixels of other color components in the displacement amount storage section. Further, it is also possible to define the displacement amount of the display sub-pixel of respective color components-based on the display position of the display pixel (display sub-pixel) of a given reference pixel without selecting the color component to be the reference among the plurality of color components constituting every pixel.

3. Although in the embodiment described above the explanations are presented assuming that the light valve is used as the light modulation section, the invention is not limited to this configuration. It is also possible to adopt, for example, Digital Light Processing (DLP, a registered trademark), Liquid Crystal On Silicon (LCOS), and so on as the light modulation section.

4. Although in the embodiment described above the explanations are presented exemplifying the light valve using so-called three-panel transmissive liquid crystal panels as the light modulation section, it is also possible to adopt a light valve using four or more panel transmissive liquid crystal panels.

5. Although in the embodiment described above the invention is explained as the image processing device, the image display apparatus, and the image processing method, the invention is not limited to these aspects. For example, the invention can be a program describing the processing procedure of the image processing method for realizing the invention or a recording medium on which the program is recorded.

The entire disclosure of Japanese Patent Application No. 2008-082853, filed Mar. 27, 2008 is expressly incorporated by reference herein.

What is claimed is:

1. An image processing device adapted to correct a pixel value corresponding to a sub-pixel constituting a pixel, comprising:
    a displacement amount storage section adapted to store a displacement amount of a display position of a display sub-pixel corresponding to a sub-pixel constituting a display pixel in a reference position in a display image plane; and
    a pixel value correction section adapted to correct the pixel value of the sub-pixel corresponding to the display sub-pixel at an end of the display image plane in accordance with the displacement amount stored in the displacement amount storage section wherein
    the displacement amount storage section stores the displacement amounts of the display positions of the display sub-pixels at a plurality of reference positions in the display image plane,
    the pixel value correction section calculates the displacement amount of the display position of the display sub-pixel at the end by interpolating the displacement amounts of the display positions of the display sub-pixels in a plurality of reference positions stored in the displacement amount storage section, and then corrects the pixel value of the sub-pixel corresponding to the display sub-pixel at the end in accordance with the displacement amount, and
    the plurality of reference positions include at least one position formed at each corner of the image display plane.

2. The image processing device according to claim 1, wherein
    the pixel value correction section includes
    a reference display sub-pixel selection section adapted to select, as a reference display sub-pixel, the display sub-pixel nearest to a center of the display image plane in a given direction among a plurality of display sub-pixels constituting the display pixels at the end,
    a display sub-pixel displacement amount calculation section adapted to calculate the displacement amounts of the remaining display sub-pixels except the reference display sub-pixel among the plurality of display sub-pixel, based on the displacement amount stored in the displacement amount storage section, and taking the display position of the reference display sub-pixel selected by the reference display sub-pixel selection section as the reference, and
    a pixel value correction operation section adapted to correct the pixel values of the sub-pixels corresponding to the remaining display sub-pixels except the reference display sub-pixel among the plurality of display sub-pixels, based on the displacement amount calculated by the display sub-pixel displacement amount calculation section.

3. The image processing device according to claim 1, wherein
- each of the pixels is constituted by at least an R component sub-pixel, a G component sub-pixel, and a B component sub-pixel, and
- the displacement amount storage section stores, based on the display position of the display sub-pixel corresponding to the G component sub-pixel constituting a display pixel at the reference position, the displacement amount of the display position of the display sub-pixel corresponding to the R component sub-pixel constituting the display pixel, and the displacement amount of the display position of the display sub-pixel corresponding to the B component sub-pixel constituting the display pixel.

4. The image processing device according to claim 1, wherein
- the pixel value correction section corrects the pixel values of the sub-pixels corresponding to the display sub-pixels at least one of a left end, a right end, an upper end, and a lower end of the display image plane.

5. The image processing device according to claim 1, wherein
- the pixel value correction section corrects a luminance value of the sub-pixel corresponding to the display sub-pixel at the end.

6. An image display apparatus comprising:
- the image processing device according to claim 1; and
- an image display section adapted to display an image based on the pixel value of the sub-pixel corrected by the image processing device.

7. The image processing device according to claim 1,
- wherein the display sub-pixels at the end of the display image plane include all pixels within a predetermined distance of the edge of the display image plane, the display sub-pixels at the end of the display image plane including less than all of the display pixels.

8. An image processing method adapted to correct a pixel value corresponding to a sub-pixel constituting a pixel, comprising:
- obtaining the pixel value of the sub-pixel corresponding to a display sub-pixel at an end of a display image plane; and
- correcting, in accordance with a displacement amount of a display position of the display sub-pixel constituting a display pixel at a reference position in the display image plane and corresponding to the sub-pixel, the pixel value of the sub-pixel corresponding to the display sub-pixel at the end of the display image plane, by calculating the displacement amount of the display position of the display sub-pixel at the end by interpolating the displacement amounts of the display positions of the display sub-pixels in a plurality of reference positions, and then correcting the pixel value of the sub-pixel corresponding to the display sub-pixel at the end in accordance with the displacement amount, wherein the plurality of reference positions include at least one position formed at each corner of the image display plane.

* * * * *